(12) United States Patent
Gozani et al.

(10) Patent No.: US 10,393,915 B2
(45) Date of Patent: Aug. 27, 2019

(54) INTEGRATED PRIMARY AND SPECIAL NUCLEAR MATERIAL ALARM RESOLUTION

(71) Applicant: Rapiscan Systems, Inc., Torrance, CA (US)

(72) Inventors: Tsahi Gozani, Palo Alto, CA (US); Joseph Bendahan, San Jose, CA (US); Michael Joseph King, Hillsborough, CA (US); Timothy John Shaw, Oakland, CA (US); John David Stevenson, Livermore, CA (US)

(73) Assignee: Rapiscan Systems, Inc., Torrance, CA (US)

( * ) Notice: Subject to any disclaimer, the term of this patent is extended or adjusted under 35 U.S.C. 154(b) by 1050 days.

(21) Appl. No.: 14/274,542

(22) Filed: May 9, 2014

(65) Prior Publication Data
US 2014/0321588 A1 Oct. 30, 2014

Related U.S. Application Data

(63) Continuation-in-part of application No. 13/035,886, filed on Feb. 25, 2011.
(Continued)

(51) Int. Cl.
*G01V 5/00* (2006.01)
*G01T 3/00* (2006.01)
*G01T 3/06* (2006.01)

(52) U.S. Cl.
CPC ............. *G01V 5/0091* (2013.01); *G01T 3/00* (2013.01); *G01T 3/06* (2013.01)

(58) Field of Classification Search
CPC ....... G01T 3/001; G01T 3/065; G01V 5/0091; G21K 1/02; G21K 1/046; G21K 1/04
See application file for complete search history.

(56) References Cited

U.S. PATENT DOCUMENTS 2,331,586 A * 10/1943 Wasisco .................. G21K 1/04
378/153
3,140,397 A 7/1964 Henry
(Continued)

FOREIGN PATENT DOCUMENTS

EP 2663885 12/2014
GB 2463550 3/2010
(Continued)

OTHER PUBLICATIONS

Jupiter, C. P. and Parez, J. "A Study of the Scintillation Properties of Various Hydrogenous and Non-Hydrogenous Solutes Dissolved in Hexafluorobenzene," IEEE Transactions on Nuclear Science, Feb. 1966, pp. 692-703.*

(Continued)

*Primary Examiner* — Sharon M Davis
(74) *Attorney, Agent, or Firm* — Novel IP

(57) ABSTRACT

The present specification discloses methods for inspecting an object. The method includes scanning an object in a two-step process. In the primary scan, a truck or cargo container (container) is completely scanned with a fan beam radiation, the transmitted radiation is measured with an array of detectors, and the transmission information and optionally the fission signatures are analyzed to determine the presence of high-density, high-Z and fissionable materials. If the container alarms in one or more areas, the areas are subjected to a secondary scan. This is done by precisely repositioning the container to the location of the suspect areas, adjusting the scanning system to focus on the suspect areas, performing a stationary irradiation of the areas, and analyzing the measured feature signatures to clear or confirm the presence of SNM.

21 Claims, 16 Drawing Sheets

Related U.S. Application Data

(60) Provisional application No. 61/821,610, filed on May 9, 2013, provisional application No. 61/313,200, filed on Mar. 12, 2010, provisional application No. 61/308,254, filed on Feb. 25, 2010.

(56) References Cited

U.S. PATENT DOCUMENTS

| | | | |
|---|---|---|---|
| 3,151,245 A * | 9/1964 | Wilson, Jr. | G21K 1/04 378/152 |
| 3,603,793 A | 9/1971 | Warren | |
| 3,898,463 A | 8/1975 | Noakes | |
| 4,031,545 A | 6/1977 | Stein | |
| 4,497,768 A | 2/1985 | Caldwell | |
| 4,667,107 A | 5/1987 | Wang | |
| 4,897,550 A | 1/1990 | Bernard | |
| 5,006,299 A | 4/1991 | Gozani | |
| 5,076,993 A | 12/1991 | Sawa | |
| 5,078,952 A | 1/1992 | Gozani | |
| 5,098,640 A | 3/1992 | Gozani | |
| 5,102,506 A * | 4/1992 | Tanielian | H01L 23/5256 205/118 |
| 5,114,662 A | 5/1992 | Gozani | |
| 5,153,439 A | 10/1992 | Gozani | |
| 5,162,096 A | 11/1992 | Gozani | |
| 5,388,128 A | 2/1995 | Gozani | |
| 5,838,759 A * | 11/1998 | Armistead | B66C 19/007 378/57 |
| 5,910,973 A | 6/1999 | Grodzins | |
| 7,505,556 B2 | 3/2009 | Chalmers | |
| 7,538,325 B2 | 5/2009 | Mishin | |
| 7,551,718 B2 | 6/2009 | Rothschild | |
| 7,924,979 B2 | 4/2011 | Rothschild | |
| 7,999,236 B2 | 8/2011 | McDevitt | |
| 2005/0105665 A1 | 5/2005 | Grodzins | |
| 2006/0067480 A1 * | 3/2006 | Juschka | G21K 1/04 378/150 |
| 2006/0188060 A1 | 8/2006 | Bertozzi | |
| 2007/0064875 A1 | 3/2007 | Li | |
| 2007/0187608 A1 | 8/2007 | Beer | |
| 2008/0175351 A1 | 7/2008 | Norman | |
| 2008/0191140 A1 * | 8/2008 | McDevitt | G01T 1/202 250/390.11 |
| 2009/0268871 A1 | 10/2009 | Rothschild | |
| 2009/0283690 A1 * | 11/2009 | Bendahan | G01V 5/0033 250/390.01 |
| 2010/0327174 A1 | 12/2010 | Edwards | |
| 2012/0155592 A1 | 6/2012 | Gozani | |

FOREIGN PATENT DOCUMENTS

| | | |
|---|---|---|
| WO | 2009137985 | 11/2009 |
| WO | 2015020710 A2 | 2/2015 |

OTHER PUBLICATIONS

"Multileaf collimators: modern beam shaping," http://medphys365.blogspot.com/2012/04/multileaf-collimators.html (Year: 2012).*

Wait, G.D. "A Hexafluorobenzene Gamma Disimeter For Use in Mixed Neutron and Gamma Fields" Jan. 1968, AD0678658, Abstract.

Wolf, A., Moreh, R., "Utilization of teflon-covered GE(Li) diodes for fast neutron detection," Nuclear Instruments and Methods, 148, 1978, 195-197.

Office Action dated Aug. 7, 2015 for U.S. Appl. No. 13/035,886.

Little, R.C.; Chadwick, M. B.; and Myers, W.L. "Detection of Highly Enriched Uranium Through Active Interrogation" Proceedings of the 11th International Conference on Nuclear Reaction Mechanics in Varenna, Italy, Jun. 2006.

Office Action dated Dec. 2, 2015 for U.S. Appl. No. 13/035,886.

"Linac based photofission inspection system employing novel detection concepts", Nuclear Instruments and Methods (2011), vol. 653, Stevenson et al, pp. 124-128.

"Neutron threshold activation detectors (TAD) for the detection of fissions", Nuclear Instruments and Methods in Physics Research (2011), vol. 652, Gozani et al., pp. 334-337.

Examination Report for GB1215374.8, dated Mar. 29, 2016.

Barnabe-Heider et al.: 'Characterization of the Response of Superheated Droplet (Bubble) Detectors.' arxiv.org, [Online] Nov. 14, 2003, pp. 1-2 Retrieved from the Internet: <URL:http://arxiv.org/PS_cache/hep-ex/pdf/0311/0311034v1.pdf> [retrieved on Nov. 8, 2011].

Office Action for Mexican Patent Application No. MX/a/2015/015514, dated Apr. 21, 2017.

International Search Report for PCT/US14/37571, dated Mar. 16, 2015.

International Search Report for PCT/US11/26369, dated Nov. 22, 2011.

* cited by examiner

FIG. 2H

| Nuclide | Reaction | Threshold (MeV) | Half-Life (sec) | Decay Products Beta (MeV) | Intensity % | Gamma (MeV) | Intensity % |
|---|---|---|---|---|---|---|---|
| 6-Li | $^6Li(n,p)^6He$ | 3.2 | 0.807 | 3.5 | 100 | N/A | N/A |
| 19-F | $^{19}F(n,p)^{19}O$ | 4.3 | 26.9 | 3.3, 4.6 | 54.4, 45.4 | 1.4 | 50.4 |
|  | $^{19}F(n,\alpha)^{16}N$ | 1.6 | 7.1 | 4.3, 10.4 | 67, 28 | 6.1 | 67 |
| 23-Na | $^{23}Na(n,p)^{23}Ne$ | 3.8 | 37.2 | 4.0, 4.4 | 32, 67 | 0.4, 1.6 | 33, 1 |
|  | $^{23}Na(n,\alpha)^{20}F$ | 4.0 | 11.1 | 5.4 | 100 | 1.6 | 100 |
| 24-Mg | $^{24}Mg(n,p)^{24}Na$ | 4.9 | 0.02 | 6.0 | 0.05 | 0.5 | 100 |
|  | (two half lives) |  | 54000 | 1.4 | 100 | 1.4, 2.8 | 100, 100 |
| 25-Mg | $^{25}Mg(n,p)^{25}Na$ | 3.2 | 59.1 | 2.9, 3.8 | 27, 63 | 1.0, 1.6 | 15, 85 |
| 26-Mg | $^{26}Mg(n,p)^{26}Na$ | 8.9 | 1.07 | 7.5 | 88 | 1.8 | 99 |
|  | $^{26}Mg(n,\alpha)^{23}Ne$ | 5.6 | 37.2 | 4.0, 4.4 | 32, 67 | 0.4, 1.6 | 33, 1 |
| 28-Si | $^{28}Si(n,p)^{28}Al$ | 4.0 | 134 | 2.86 | 100 | 1.8 | 100 |
|  | $^{28}Si(n,\alpha)^{25}Mg$ | 2.8 | Stable | N/A | N/A | N/A | N/A |
| 34-S | $^{34}S(n,p)^{34}P$ | 4.7 | 12.4 | 3.2, 5.4 | 15, 85 | 2.1, 4.1 | 15, 0.2 |
|  | $^{34}S(n,\alpha)^{31}Si$ | 1.4 | 9420 | 1.5 | 100 | N/A | N/A |
| 37-Cl | $^{37}Cl(n,p)^{37}S$ | 4.2 | 303 | 1.8, 4.9 | 94, 5.6 | 3.1 | 94 |
|  | $^{37}Cl(n,\alpha)^{34}P$ | 1.6 | 12.4 | 3.2, 5.4 | 15, 85 | 2.1, 4.1 | 15, 0.2 |

|   | Radiation source | Probing radiation | X-ray Radiography | Fission signatures measured | | | |
|---|---|---|---|---|---|---|---|
|   |   |   |   | Prompt neutrons/ fast fission | Prompt neutrons/ thermal fission | Delayed neutrons | Delayed γ-rays |
| 1 | CW or pulsed electron accelerator | X-rays | yes | yes | n/a | yes | yes |
| 2 | Charged particle accelerator (e.g. p, d, etc) | γ-rays | no | yes | n/a | yes | yes |
| 3 | Charged particle accelerators (e.g. p, d, etc) | neutrons | no | yes | yes | yes | yes |
| 4 | Photoneutron generation by x-ray conversion | neutrons | yes | yes | yes | yes | yes |

FIG. 3

INTEGRATED PRIMARY AND SPECIAL NUCLEAR MATERIAL ALARM RESOLUTION

CROSS-REFERENCE TO RELATED APPLICATIONS

The present specification relies on U.S. Provisional Patent Application No. 61/821,610, entitled "Integrated Primary and Special Nuclear Material Alarm Resolution" and filed on May 9, 2013, for priority.

The present specification is also a continuation-in-part of U.S. patent application Ser. No. 13/035,886, entitled "Systems and Methods for Detecting Nuclear Material", and filed on Feb. 25, 2011, which, in turn, relies upon U.S. Provisional Patent Application No. 61/308,254, filed on Feb. 25, 2010, for priority and U.S. Provisional Patent Application No. 61/313,200, filed on Mar. 12, 2010, for priority.

All of the above-mentioned applications are herein incorporated by reference in their entirety.

FIELD OF THE INVENTION

The present specification describes systems and methods for detecting specific classes of materials in transmission images and clearing or confirming their presence. More specifically, the present specification describes systems and methods for automatically and rapidly detecting the presence of high-atomic-number (high-Z) materials such as nuclear materials, nuclear weapons, and shielding materials that may be used to shield radiation emitted by such materials as well as by radiological dispersal devices, which can prevent them from being detected by passive radiation detectors.

BACKGROUND OF THE INVENTION

Radiographic images are produced by the detection of radiation that is transmitted through the object (e.g. the cargo in a truck or container) being inspected. The density, atomic number and the total amount of material that is present in the object determine how much of the radiation is attenuated and, therefore, the nature and type of radiographic image produced. In addition to determining the absorption of the X-ray, gamma-rays, or neutrons as they travel along their various paths, it is possible to derive information about the characteristics of the material. Conventionally, images are produced using single- or dual-energy X-ray beams to generate attenuation maps and to provide some atomic number information. The identification of areas in the image where high-Z materials, such as special nuclear materials (SNM) are present is of specific security interest related to the detection of certain classes of weapons of mass destruction (WMD). It is desirable for the images to contain additional information to improve the detection of high-Z materials.

Further, the threat of nuclear material and nuclear device smuggling requires a fast and reliable non-intrusive inspection of all types of conveyances, such as containers and cargo at sea and airports or trucks at land ports of entry. Detection of the spontaneous emission of radiation from nuclear material has known limitations, which can be overcome by using active interrogation. Active interrogation typically employs narrow or wide beams of penetrating probes such as neutrons or high-energy X-rays to induce fissions in the nuclear material, if present.

Nuclear material is detected by exposing a container to radiation, such as X-ray radiation or neutrons, and inducing fission by interaction of the radiation with the nuclear material, referred to as photo-fission or neutron fission, respectively. The fission process causes the nuclear material to emit multiple signatures such as Prompt Neutrons, Delayed Neutrons, Prompt gamma rays and Delayed gamma rays. In the past, most systems were designed to detect fission events by detecting the delayed-neutron signature(s) using detector arrays positioned external to the irradiated container. The detection of fission-related delayed neutrons is a very strong indication that nuclear material is present. Delayed neutrons, however, while a unique indicator of the occurrence of fission, are very few in number and of low energy, thereby severely reducing the efficacy of the inspection system, especially for hydrogenous cargo.

In some instances, the sole fission signature measured is that due to the delayed gamma rays. This signature can be highly attenuated in metallic cargos. In these cases, it is much more desirable to detect fission prompt neutrons, which are more abundant and penetrating than delayed neutrons. However, the fission prompt neutrons are produced at virtually the same time as the far more numerous probing radiation incident on the nuclear material; thus resulting in blinding all detectors. Generally, by the time the detectors recover, no prompt-neutron signature exists.

Accordingly, there is need for methods and systems for improving the detection of high-Z materials using high-throughput radiographic means. There is also a need for improved method and systems for confirming the presence of nuclear materials that do not depend solely on one signature, but on multiple signatures where the vulnerabilities of one signature are mitigated by the strength of the others. Similarly, multiple probing radiation types, such as X-rays and neutrons used separately or in simultaneously make the inspection system far more sensitive to concealed nuclear material over the wide range of cargo type encountered in commerce.

SUMMARY OF THE INVENTION

The present specification describes a method for scanning an object in a two-step process. In the primary scan, a truck or cargo container is completely scanned with a fan beam of single or multi-energy high-energy radiation, where the transmitted radiation is measured with an array of detectors that may be energy sensitive. The transmission information and optionally the fission signatures are analyzed to determine the presence of high-density, high-Z and fissionable materials.

If the container alarms in one or more areas, the areas are subjected to a secondary scan. In the secondary scan, the container is repositioned to the location of suspect areas, and the scanning system may optionally be adjusted to focus on the suspect areas. The system performs a stationary irradiation of the areas and analyzes the measured feature signatures to clear or confirm the presence of special nuclear materials (SNM).

In one embodiment, the present specification describes an inspection system for inspecting an object using radiation comprising: a radiation source for generating and transmitting radiation; a collimator positioned in front of said radiation source wherein said collimator comprises two vertical structures defining a vertical slit through which said transmitted radiation is directed and a plurality of horizontally movable members positioned in front of said vertical slit, wherein said plurality of horizontally movable members each have a first configuration where they block more of the transmitted radiation from passing through the vertical slit and a second configuration where they block less of the transmitted radiation from passing through the vertical slit; a detector array for detecting a portion of transmitted radiation passing through said object; and a controller, wherein said controller is programmed to cause at least a portion of said horizontally movable members to move depending upon a scanning mode.

The scanning mode may be a first stage scanning mode wherein, in response to the first stage scanning mode, the controller causes each of said plurality of horizontal members to be positioned to block an equivalent portion of said vertical slit.

Optionally, said equivalent portion of said vertical slit is no portion of said vertical slit, thereby enabling a maximum width fan beam to be generated.

Optionally, the system further comprises a processor, which may be adapted to analyze said detected radiation to determine a presence of high-density and high atomic number materials. Still optionally, the processor is adapted to determine whether to conduct a second scan based upon said determination of a presence of high-density and high atomic number materials.

The controller may be adapted to reposition said radiation source and reposition at least a portion of said plurality of horizontal members based upon said determination of whether to conduct a second scan. Further, the repositioning of the radiation source and the at least a portion of said plurality of horizontal members may occur after a first scan and wherein said repositioning may enable generation of a fan beam focused on a suspect area that is smaller than an area scanned in said first scan.

Optionally, upon repositioning the at least a portion of said plurality of horizontal members, each of said plurality of horizontal members do not block an equivalent portion of said vertical slit.

Optionally, the controller is adapted to execute a second scan after said repositioning of said radiation source or the at least a portion of said plurality of horizontal members.

The processor may be adapted to analyze radiation detected in said second scan to measure radiation signatures and analyze the measured radiation signatures to clear or confirm a presence of high-density or high atomic number materials in at least one suspect area.

Optionally, in the first configuration, the plurality of horizontal members is positioned to block all of the transmitted radiation from passing through the vertical slit.

Optionally, in the second configuration, the plurality of horizontal members is positioned to block none of the transmitted radiation from passing through the vertical slit.

Still optionally, in the first or second configuration, the plurality of horizontal members is positioned to block some of the transmitted radiation from passing through the vertical slit.

Optionally, the radiation source comprises a single energy or multi-energy X-ray source having an energy of approximately 9 MV. Still optionally, the X-ray source is coupled with a neutron production target such as to produce a mixed x-ray and neutron beam. Still optionally, the neutron production target is deuterium or beryllium. Still optionally, the source is a neutron source.

Optionally, the detector array is spectroscopic and the determination of high atomic number material is based on a spectral analysis.

The processor may be configured to analyze fission signatures to determine a presence of fissionable materials.

The system may optionally include at least one plastic or liquid scintillator wherein said at least one plastic or liquid scintillator is configured to measure delayed gamma rays.

The system may include a threshold-activation detector, wherein said threshold-activation detector is configured to measure prompt neutrons. Optionally, the threshold-activation detector is a fluorocarbon-based detector.

The system may optionally include at least one neutron detector wherein said neutron detector is configured to measure delayed gamma rays.

In another embodiment, the present specification describes an inspection system for inspecting an object using radiation comprising: an X-ray source for generating and transmitting X-ray radiation; a collimator positioned in front of said X-ray radiation source wherein said collimator comprises two vertical structures defining a vertical slit through which said transmitted X-ray radiation is directed and a plurality of horizontally movable members positioned in front of said vertical slit, wherein said plurality of horizontally movable members each have a first configuration where they block more of the transmitted radiation from passing through the vertical slit and a second configuration where they block less of the transmitted radiation from passing through the vertical slit; a detector array for detecting a portion of transmitted radiation passing through said object; and a controller, wherein said controller is programmed to cause at least a portion of said horizontally movable members to move depending upon a mode of operation.

Optionally, the mode of operation is a first stage scanning mode and wherein, in response to the first stage scanning mode, the controller causes each of said plurality of horizontal members to be positioned to block an equivalent portion of said vertical slit.

The system may further include a processor, wherein the processor may be adapted to analyze said detected radiation to determine a presence of high-density or high atomic number materials.

Optionally, the processor is adapted to determine whether to conduct a second scan based upon said determination of a presence of high-density or high atomic number materials.

Optionally, the processor is adapted to determine a location of a suspect area containing a presence of high-density or high atomic number materials.

The controller may be adapted to reposition said X-ray radiation source based upon the location of the suspect area.

The controller may be adapted to rotate the X-ray radiation source so that a center axis of the X-ray radiation source is aligned with a center axis of the suspect area.

Optionally, the controller causes an area external to, but proximate to, said suspect area to be scanned to generate a background signal and wherein said processor subtracts said background signal from a signal generated by scanning the suspect area.

Optionally, the system comprises a second stage scanning system that includes a second X-ray source for generating and transmitting X-ray radiation; a second collimator positioned in front of said X-ray radiation source wherein said second collimator comprises two vertical structures defining a vertical slit through which said transmitted X-ray radiation is directed and a plurality of horizontally movable members positioned in front of said vertical slit, wherein said plurality of horizontally movable members each have a first configuration where they block more of the transmitted radiation from passing through the vertical slit and a second configuration where they block less of the transmitted radiation from passing through the vertical slit; and a second detector array for detecting a portion of transmitted radiation passing through said object.

The processor may be adapted to determine a location of a suspect area containing a presence of high-density or high atomic number materials.

The controller may be adapted to reposition said second X-ray radiation source or a portion of the plurality of horizontally moveable members of the second collimator based upon the location of the suspect area.

In yet another embodiment, the present specification describes a method for inspecting an object using an inspection system comprising the steps of: conducting a first scan wherein said first scan causes a fan beam of radiation to be transmitted through the object, detecting transmitted radiation using at least one detector array, an conducting, via a processing system, a first analysis of transmitted radiation data to determine a presence of high-density and high atomic number materials; determining whether to conduct a second scan based upon said first analysis; repositioning at least a portion of the inspection system relative to a detected location of at least one suspect area; performing a stationary irradiation of said at least one suspect area; measuring radiation signatures; and analyzing the measured radiation signatures to clear or confirm the presence of high-density and high atomic number materials in the at least one suspect area.

Optionally, the scanning radiation comprises a single energy or multi-energy x-ray source having an energy of approximately 9 MV.

Optionally, the x-ray source is coupled with a neutron production target such as deuterium or beryllium to produce a mixed x-ray and neutron beam.

Optionally, the source is a neutron source.

The at least one detector array for detecting transmitted radiation may be spectroscopic and the determination of the high-Z material may be based on the spectral analysis.

Optionally, the processing system analyzes fission signatures to determine a presence of fissionable materials.

Optionally, the delayed gamma rays are measured with at least one of a plastic or a liquid scintillator.

Optionally, the prompt neutrons are measured with a threshold-activation detector such as a fluorocarbon-based detector.

Optionally, the delayed neutrons are measured with neutron detectors.

Optionally, the step of repositioning at least a portion of the inspection system relative to a detected location of suspect areas includes collimating the fan beam vertically, using at least one horizontally moveable section, to transmit the radiation directed towards the area of interest.

The source may be rotated so that a center axis of the radiation source is aligned with the center axis of the at least one suspect area.

A steering element may be used to direct a center axis of an electron beam produced by the source with a center axis of the at least one suspect area.

Optionally, an area close to the at least one suspect area is scanned and the background may be subtracted from the signal obtained from scanning the area of interest.

In yet another embodiment, the present specification is directed toward a method for inspecting an object using radiation comprising: generating and transmitting radiation produced by a source; collimating said radiation, using a vertical collimator, to produce a fan-beam of radiation; detecting a portion of transmitted radiation passing through said object, using a first detector array; detecting fission signatures using a second detector array; moving the object relative to the detection system, using a conveyor mechanism; analyzing scan data and issuing a high-Z alarm where a high-Z material is present, using a processor; repositioning at least a portion of the inspection system relative to a detected location of at least one suspect area; performing a secondary stationary irradiation of said at least one suspect area; measuring fission signatures; and analyzing the measured fission signatures to clear or confirm the presence of high-Z materials, using a processor.

Optionally, the vertical collimator comprises horizontal members to block at least a portion of the fan beam not directed to the alarming object during a secondary scan.

The aforementioned and other embodiments of the present shall be described in greater depth in the drawings and detailed description provided below.

BRIEF DESCRIPTION OF THE DRAWINGS

These and other features and advantages of the present invention will be further appreciated, as they become better understood by reference to the detailed description when considered in connection with the accompanying drawings:

FIG. 2H is a table showing exemplary isotopes that can be employed with the threshold-activation detectors of the present invention;

FIG. 3 is a chart showing a plurality of parameters associated with embodiments of the present invention;

DETAILED DESCRIPTION OF THE INVENTION

The present invention is directed towards multiple embodiments of system to detect nuclear material based on at least one source of probing radiation and a plurality of radiation signatures. The following disclosure is provided in order to enable a person having ordinary skill in the art to practice the invention. Language used in this specification should not be interpreted as a general disavowal of any one specific embodiment or used to limit the claims beyond the meaning of the terms used therein. The general principles defined herein may be applied to other embodiments and applications without departing from the spirit and scope of the invention. Also, the terminology and phraseology used is for the purpose of describing exemplary embodiments and should not be considered limiting. Thus, the present specification is to be accorded the widest scope encompassing numerous alternatives, modifications and equivalents consistent with the principles and features disclosed. For purpose of clarity, details relating to technical material that is known in the technical fields related to the invention have not been described in detail so as not to unnecessarily obscure the present specification.

Figure 1:
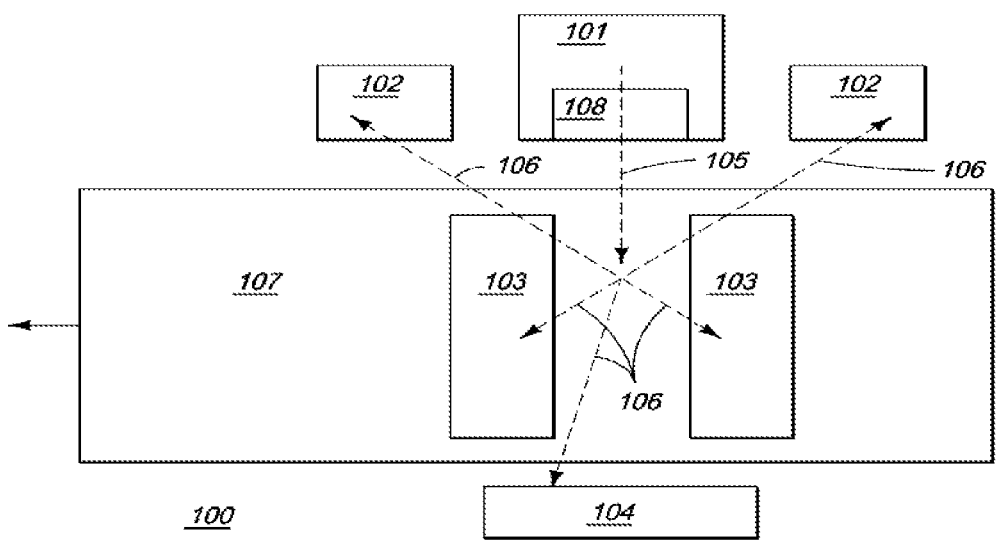
FIG. 1 is a block diagram illustration of one embodiment of the nuclear detection system of the present invention.

As shown in FIG. 1, in one embodiment, the X-ray inspection system 100 of the present invention comprises a high energy source 101, such as an electron linear accelerator (linac), typically with energies on the order of 6 to 9 MeV, and preferably 8 MeV or higher. Persons of ordinary skill in the art should note that the higher the energy of the source, the more sensitive to nuclear material the system 100 becomes. Further, the source includes appropriate shielding and collimation, depending upon the nature of the source, as is well-known to those of ordinary skill in the art. Probing radiation 105 emanating from source 101 and directed towards object 107 induces fission via the photo-fission process in any nuclear material that may be present in object 107. In one embodiment, object 107 is a stationary or moving object under inspection such as a truck, shipping container, cargo container and the like.

In another embodiment, a fast-neutron probe and X-ray probe are integrated to improve detection sensitivity across all types of cargo. X-rays penetrate very well into organic or hydrogenous material (e.g., food, wood, and plastic etc.) and less well into dense metallic cargo. On the other hand, fast neutrons penetrate well into metallic cargo but less well into hydrogenous cargo. Therefore, by combining these two different probing sources, fast neutrons and X-rays, and simultaneously or sequentially inspecting the same conveyance using these two different sources, the inspection system of the present invention can achieve high sensitivity across all types of cargos.

Persons of ordinary skill in the art should appreciate that neutrons can be generated by the well-known photo-nuclear reaction of high energy X-rays with materials having a low energy threshold for the photo-neutron reaction, such as heavy water (which is water where the hydrogen is replaced by its naturally occurring isotope, deuterium), beryllium, or any other suitable materials known in the art.

Referring back to FIG. 1, in one embodiment, a neutron-converting material 108 surrounds, is proximate to, adjacent to or otherwise positioned in front of X-ray source 101 (at the X-ray target element where the intensity is the highest), as a result of which a small fraction of the X-rays are converted into an intense neutron source (in excess of $10^{11}$ n/s for 100 µAmp 9 MeV electron linac) with most of the neutrons having an energy of less than 3 MeV. In one embodiment, the neutron-converting or inducing material is tungsten. This enables simultaneous interrogation of cargo 107 with two highly complementary irradiation probes: X-rays and fast neutrons, using the same source of radiation (such as a commercial linac, as described in detail above).

The X-ray system 100 further comprises detector arrays 102, 103, 104, which in one embodiment are located around three sides (in front, behind, or on top) of the inspected object 107. In one embodiment, detector arrays 102 are positioned proximate to radiation source 101 and detect any radiation that is backscattered relative to the probing beam. In one embodiment, detectors 102 are located adjacent to and on lateral sides of radiation source 101. In one embodiment, detector arrays 103 are positioned above or below the object under inspection. In one embodiment, detector arrays 104 are positioned on the opposite side of the object as the source and serve to detect radiation transmitted through the object relative to the probing beam direction. Therefore, once radiation 105 is directed towards container 107, if nuclear materials are present, then the resultant fission prompt neutrons, delayed-gamma rays and delayed neutrons 106 pass through the object and can be detected by the detector arrays 102, 103, and 104.

In one embodiment, the detector arrays 102, 103, and 104 optionally include some lower cost plastic scintillator or liquid scintillator detectors which detect only fission delayed-gamma rays.

In another embodiment, the detector arrays 102, 103, and 104 optionally include moderated He-3 detectors or an equivalent replacement. One such embodiment of a suitable detector is described in issued U.S. Pat. No. 8,389,941, by the Applicant of the present specification and herein incorporated by reference in its entirety.

In one embodiment, the detector arrays 102, 103, 104 comprise neutron threshold-activation materials that are used to detect the higher energy, more penetrating neutrons, which are much more prolific well after the fission process than delayed-neutron fission signatures, and also detect any overload resulting from the blinding X-ray source.

It should be noted herein that the detector arrays 102, 103, 104 comprise at least one of and in some embodiments, a combination of, plastic and liquid scintillator detectors, fluorocarbon detectors, moderated He-3 detectors or He-3 equivalent replacements or any other detector suitable for the present invention depending upon the source and detection requirements.

The use of a threshold-activation detector (TAD) is advantageous because of its ability to detect prompt neutrons generated by activation, well after the source's blinding radiation has stopped. A typical pulsed source (e.g. of X-ray or neutrons) can be from a few microseconds to milliseconds wide, having a repetition rate of a few times per second to hundred or thousand times per second. The times between pulses affords enough time for the detectors to recover from the overload that may occur during the pulse and to collect an ample activation signal. The activation materials of the TAD are selected to have half-lives ranging from a second to tens of seconds. The activation material is also selected to have a higher energy threshold so they will be activated only by the neutrons of interest (e.g. the higher energy fission prompt neutrons) and not by the numerous lower energy neutrons that originate directly or indirectly from the source. The TAD system allows the measurement to be conducted in situ or to quickly transfer the activated material to a location where the background is very low further increasing the sensitivity of detection.

Figure 2A:
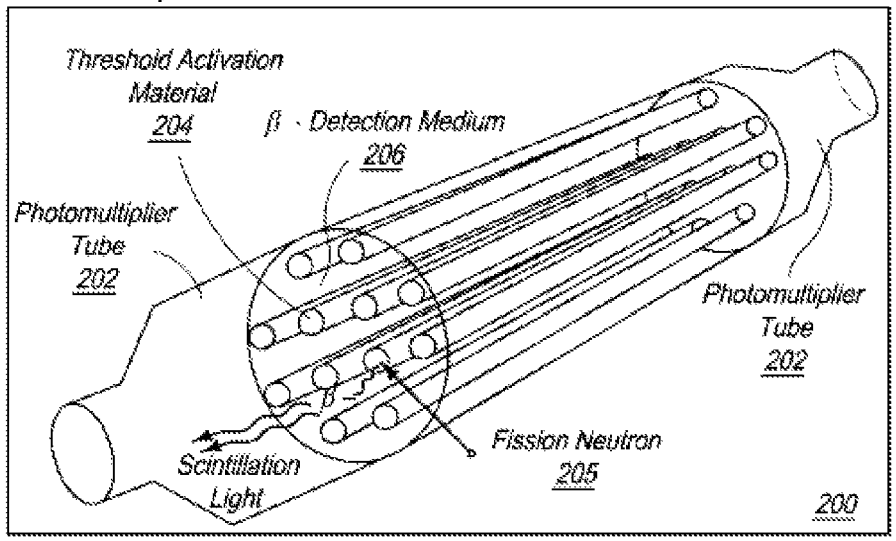
FIG. 2A is an illustration of an external detection neutron threshold-activation detector with an activating substance and a separate gamma ray detector.

In one embodiment the threshold-activation detector (TAD) is an activating substance (such as, but not limited to fluorocarbon-containing materials, i.e. Teflon®) with a separate gamma ray detector (such as NaI scintillation detectors which is usually employed to detect, between beam pulses, the thermal-neutron-capture gamma rays) for detecting the gamma-rays emitted by the activated material. Referring now to FIG. 2A, in an externally detected configuration, the threshold-activation detector 200 of the present invention comprises at least one threshold-activation material "rod" 204 immersed, for example, in a scintillator substance 206 viewed by one or more photomultipliers 202 for detecting the beta-radiation 207 resulting from the activation of the threshold-activation material/TAD 204 by prompt fission neutrons 205.

In another embodiment, the activating substance is also a scintillating material, such as, but not limited to certain fluorocarbons such as but not limited to $C_6F_6$, $BaF_2$, $CaF_2$, thus allowing the detection of the beta activity with close to 100% efficiency and also gamma-rays, but with lower efficiency, depending on the size of the detector.

Figure 2B:
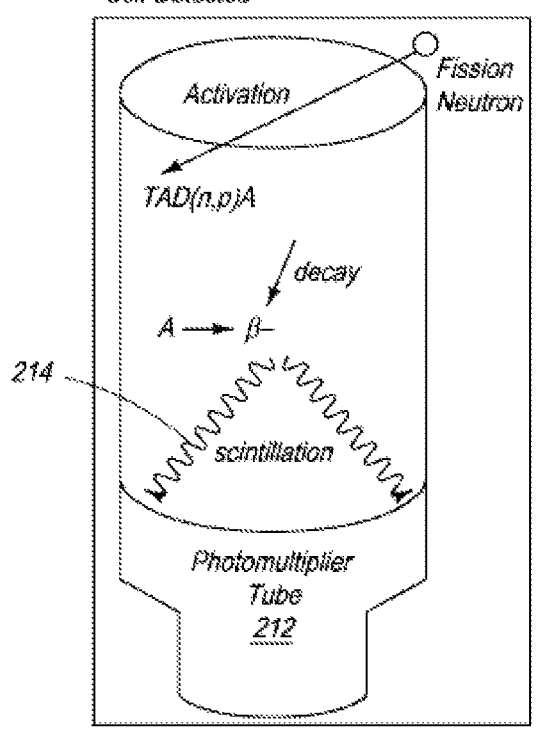
FIG. 2B is an illustration of a self-detection threshold-activation detector in which the activating substance is also a scintillator.

Referring now to FIG. 2B, in a self-detecting configuration, the threshold-activation detector 210 of the present invention comprises a photomultiplier tube 212 for housing a scintillating material 214 that is capable of detecting both beta activity and gamma-rays.

Therefore, in one embodiment, neutron threshold-activation materials include, but are not limited to fluorine-containing compounds, which are activated by fission neutrons (with an energy above 3 MeV in the case of fluorine) producing a short-lived radioactive material (nitrogen-16, an isotope of nitrogen with a half-life of 7.1 s in the case of a fluorine reaction) that decays by always emitting beta particles and often emitting gamma rays (as is the case with fluorine) which can be detected by an appropriate detector, such as the unique threshold-activation detector described in U.S. patent application Ser. No. 13/035,886, by the Applicant of the present specification, which is herein incorporated by reference in its entirety. The fluorocarbon threshold-activation detector described above, and employed in one embodiment, is also an efficient gamma ray detector and thus, also detects the fission delayed-gamma rays.

Thus, in one embodiment, the threshold-activation detector employs a fluorocarbon scintillation counter and the prompt neutrons activate the detector material itself. The activation products emit beta particles with a 7.1-second half-life and are detected with a very high efficiency well after the blinding radiation of the radiation probe is over.

Figure 2C:
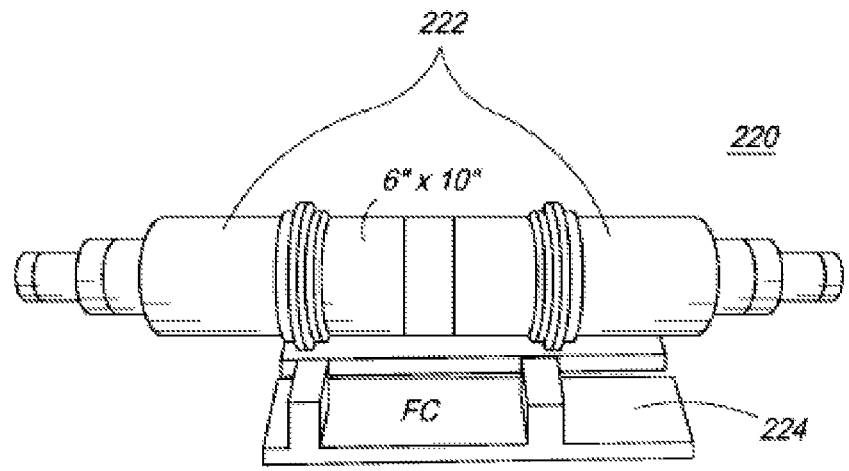
FIG. 2C shows a fabricated, cylindrical Fluorine-based TAD, where the scintillator is also the activation substance, viewed by two 5-inch×10-inch photomultipliers.

FIG. 2C shows a fabricated, cylindrical Fluorine-based TAD 220, where the scintillator is also the activation substance, viewed by two 5-inch×10-inch photomultipliers 222 on a wooden crate 224.

Figure 2D:
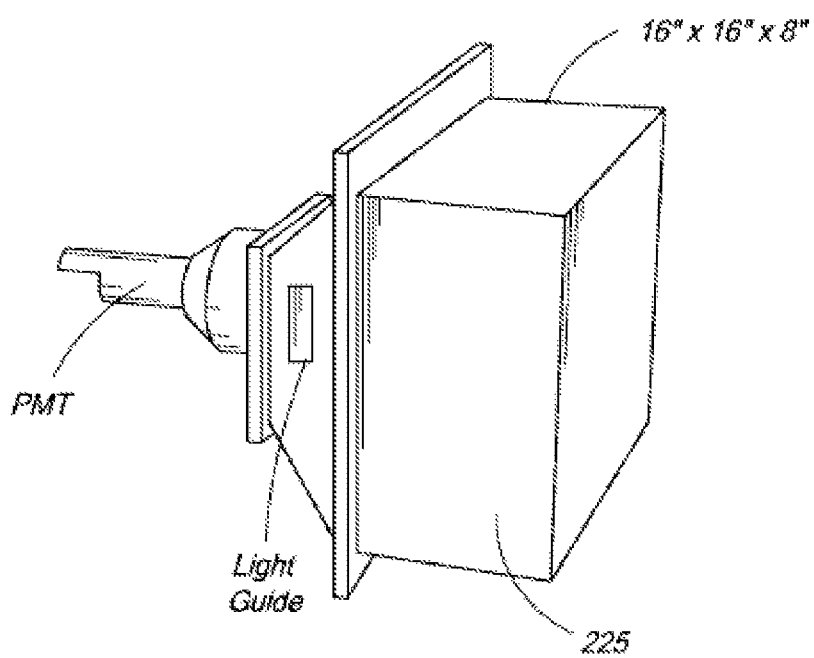
FIG. 2D shows a fabricated single "tile" of fluorine-based threshold-activation detector, used in the inspection system of the present invention, having dimensions of 40 cm×40 cm×20 cm.

FIG. 2D shows a fabricated, single "tile" 225 of a fluorine-based threshold-activation detector, used in the inspection system of the present invention, having dimensions of 40 cm×40 cm×20 cm, which in one embodiment, can be made into a sufficiently large area detector (covering, for example, more than 2.56 $m^2$) comprising 16 "tiles" 225 to ensure high detector efficiency, thereby further increasing detection sensitivity and measurement speed. In another embodiment, detector "tiles" 225 can also comprise a lower-cost plastic scintillator of the same size.

Figure 2E:
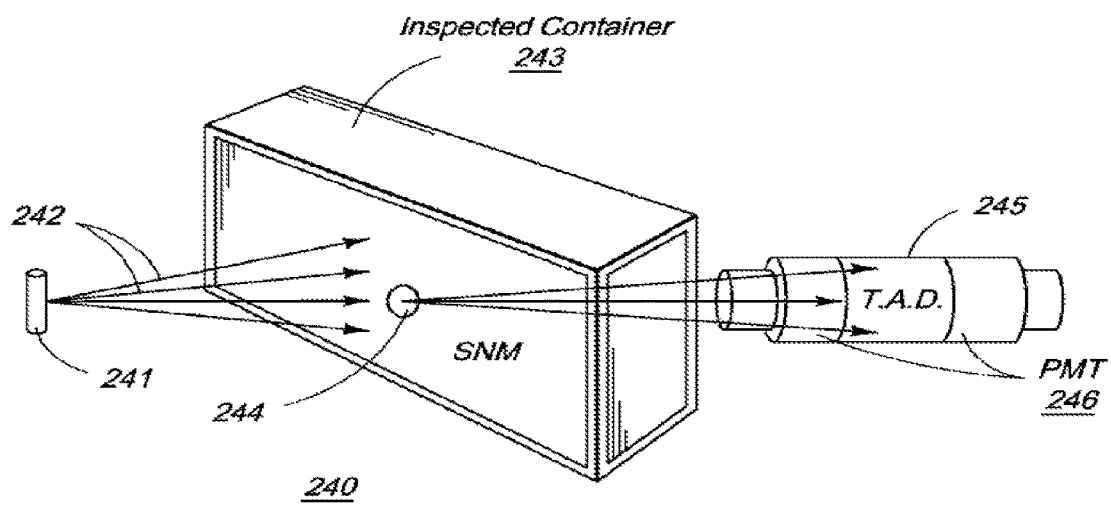
FIG. 2E is a schematic illustration of an exemplary inspection system employing the threshold-activation detectors (TAD) of the present invention.

FIG. 2E is a schematic illustration of an exemplary inspection system employing the threshold-activation detectors (TAD) of the present invention. As shown in FIG. 2E, the exemplary inspection system 240 comprises an interrogation source 241 and a fission fast neutron detector 245, which in one embodiment, is a threshold-activation detector (TAD). The interrogation source 241 produces interrogation radiation 242. In one embodiment, the interrogation radiation 242 is radiation comprising mostly neutrons having an energy on the order of ≤3 MeV. In another embodiment, the interrogation radiation 242 is radiation comprising X-rays having an energy on the order of ≤9.0 MeV. In yet another embodiment, the interrogation radiation 242 comprises both neutrons having an energy on the order of ≤3 MeV and X-rays having an energy on the order of ≤9.0 MeV. The interrogation radiation is directed towards a container 243, which may or may not contain nuclear material 244. Once interrogation radiation 242 is directed towards container 243, if nuclear materials 244 are present, then the resultant fission prompt neutrons pass through and are detected by TAD 245, viewed by two photomultipliers 246. In one embodiment when the TAD material is also a scintillant such as the fluorocarbon liquid scintillator detector, the same detector array used for detecting prompt neutrons is used to also detect delayed gamma rays. The prompt neutron and gamma ray signatures are distinguished by way of their measured energy spectrum.

Figure 2F:
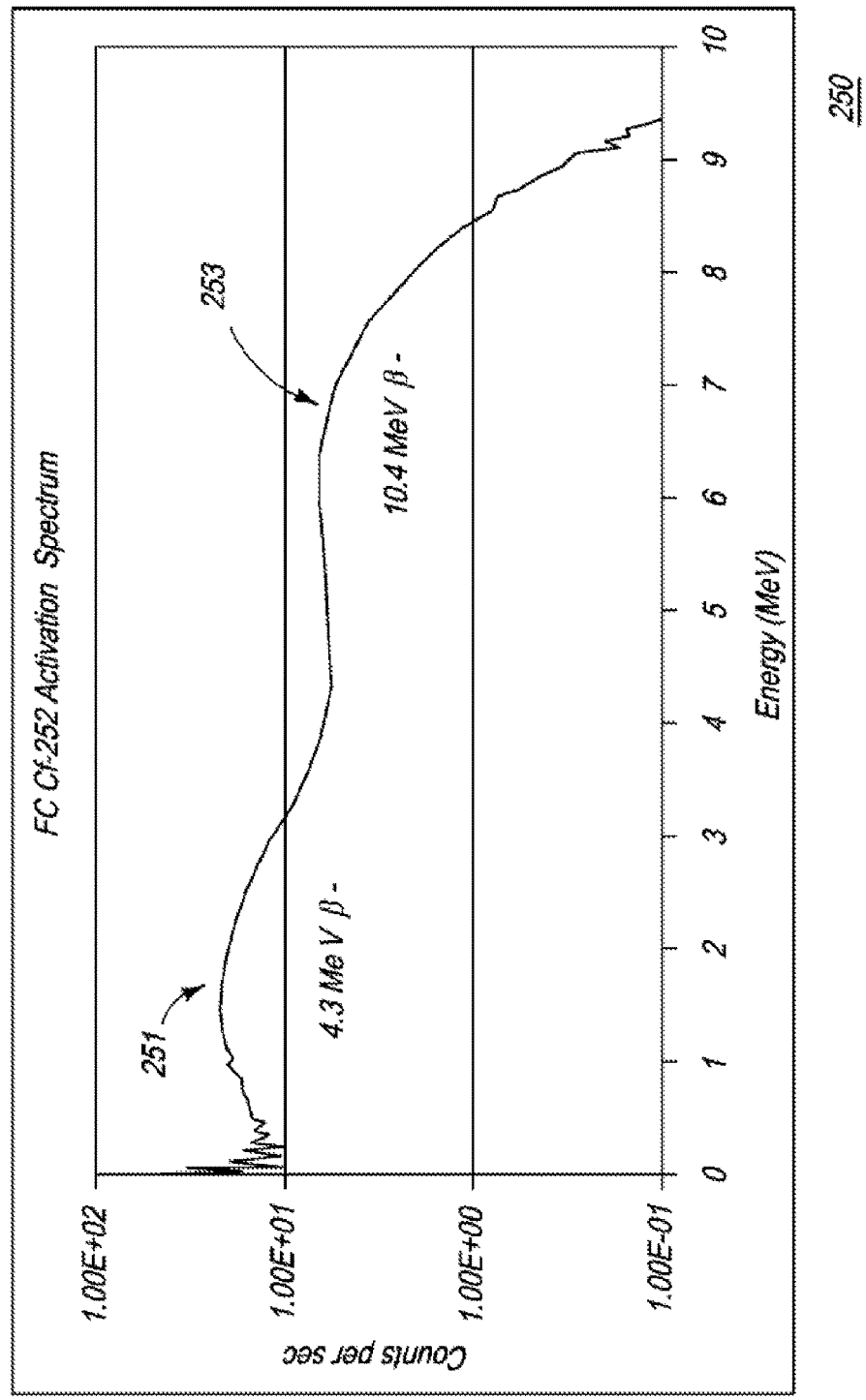
FIG. 2F is a graph showing the beta-ray spectrum induced by fission neutrons from a $^{252}Cf$ source.

FIG. 2F is a graph showing the beta-ray spectrum induced by fission neutrons from a $^{252}Cf$ source. The exemplary spectrum 250 was obtained by repeating 10 s exposures of the fluorocarbon detector to a $^{252}Cf$ source followed by a 10 s measurement while the source is inactive. The two broad hills or bulges 251, 253 in the spectrum 250 in FIG. 2F primarily represent the superimposition of the two beta energy spectra having an endpoint energy of 4.3 and 10.4 MeV, respectively.

Figure 2G:
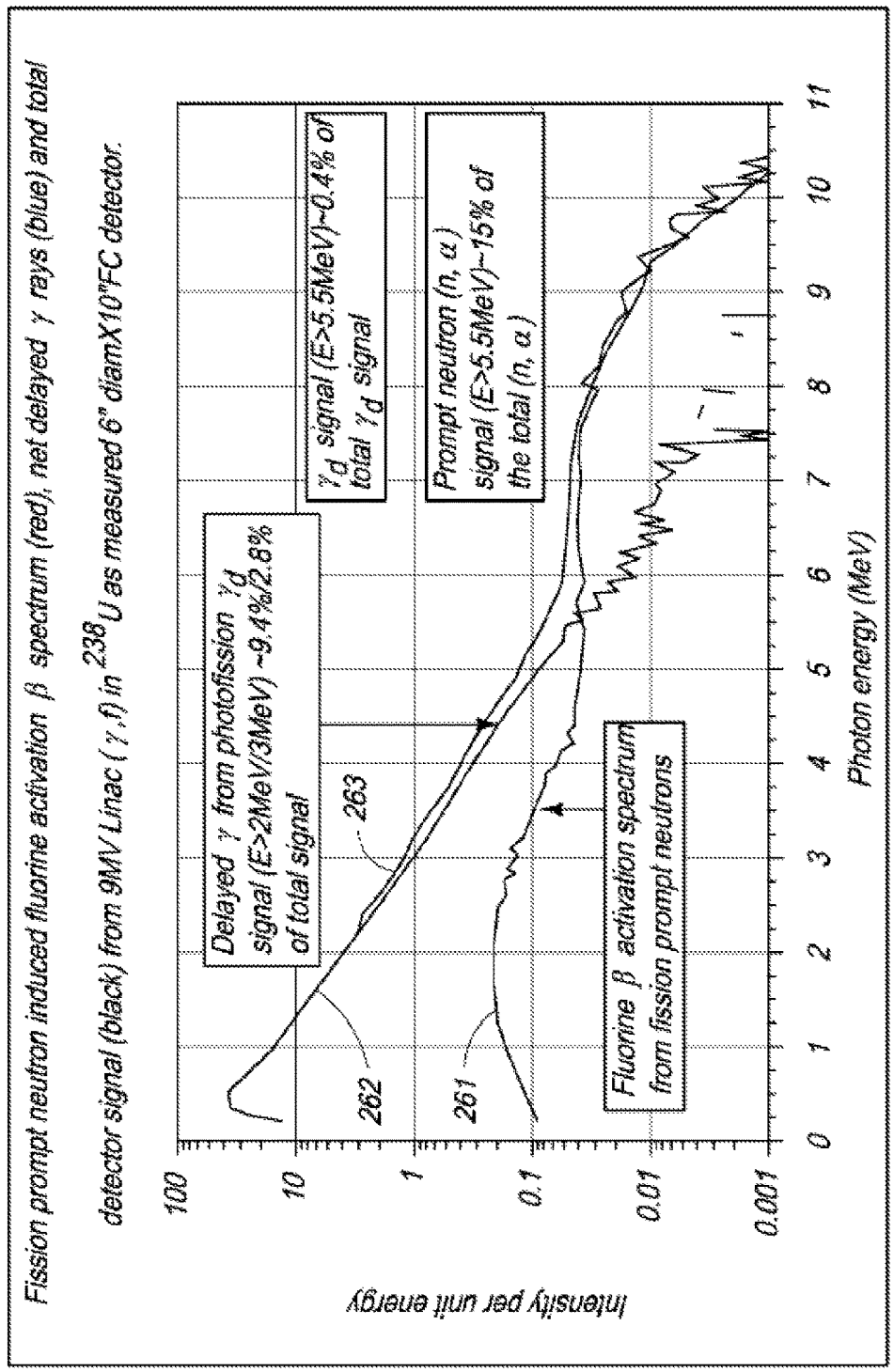
FIG. 2G is a graphical illustration of a Fluorine-based TAD, showing a typical energy spectrum for the fluorocarbon detector after irradiation of uranium with a photo-fission source.

FIG. 2G shows the actual measurement of the response of Fluorine-based TAD to photo-fission induced by a 9 MeV x-ray linac in uranium 263. Also shown are the prompt-neutron activation beta decay energy spectrum 261 for the fluorocarbon detector after irradiation with a fission source, similar to spectrum 250 shown in FIG. 2F. The liquid fluorocarbon detector utilizes the $^{19}F(n,\alpha)^{16}N$ reaction. When a fast neutron interacts with fluorine, an alpha particle and an excited $^{16}N$ atom are produced. Referring back to FIG. 2F, $^{16}N$ decays with a 7.1 s half-life and produces two high-energy beta-spectra 251, 253 (4.3 MeV 67% of the time and 10.4 MeV 28% of the time) and a 6.1 MeV gamma-ray 67% of the time, which are all readily detectable.

Referring back to FIG. 2G, spectrum 263 contains a contribution from the broad Compton scattering spectrum of the 6.1 MeV gamma rays and 4.84 MeV beta particles from the $^{19}F(n,p)^{19}O$ reaction.

The exponentially declining energy spectrum of the delayed fission gamma rays is also shown as 262. It is measured along with the $^{19}F(n,\alpha)$ activation between the 9 MV linac pulses. In this mode of operation, the linac is pulsed 20 to 100 pulses per second; each pulse is typically 2-4 μs wide. The fission delayed-gamma rays and the fluorine activation of the fluorocarbon detector itself is collected between the pulses.

The combined, observed spectrum from fission in uranium in fluorocarbon is shown by curve 263, and it is the sum of the delayed-gamma ray spectrum, shown as curve 262 and the prompt-neutron activation spectrum, shown as curve 261. Curve 263 is an exponentially declining spectrum with a broad bulge commencing at about 5.5. MeV and ending at about 10.4 MeV. When the "double-bulge" $^{252}$Cf spectrum is normalized to the former spectrum above 7 MeV and subtracted from the latter, the difference is the exponentially declining spectrum representing typical fission delayed-gamma ray spectrum 262. The fraction of the delayed-gamma ray spectrum above 5.5 MeV is very small (approximately 0.4%), whereas that of prompt-neutron fluorine activation is quite substantial. The spectrum above 5 MeV is virtually dominated by the prompt-neutron activation allowing for the determination of the two signatures employing one detector type.

FIG. 2H is a table showing exemplary isotopes 270 that can be employed as threshold-activation detectors of the present invention. In addition, the table shows the specific activation reactions 271 of each isotope 270, along with the threshold-activation energy 272 (in MeV), the half-life of the isotope 273, the energies of the beta decay products and their respective intensities 274, and the gamma rays produced and their respective intensities 275.

It should be appreciated by those of ordinary skill in the art that detection of multiple fission signatures using the unique detector system ensures that the high complementarity (in terms of penetration) of the irradiation probes (fast neutrons and high energy X-rays) is fully utilized, in accordance with an aspect of the present invention. It should further be appreciated that applying fast neutrons, if appropriately pulsed, affords the use of the extremely high sensitivity of the Differential Die Away Analysis (DDAA)—or the detection of prompt neutrons resulting from thermal-neutron fission only in fissile isotopes (e.g., U-235, Pu-239, U-233). DDAA can be employed with a very high efficiency when fissions are induced by thermalized source neutrons in the special nuclear materials (SNM). The thermalization process is fast, where the resultant thermal neutrons very efficiently stimulate fissions for hundreds of microseconds, only in SNM if they are present. The high energy fission neutrons produced by the thermal neutrons can be detected with high efficiency cadmium-covered detectors containing $^3$He proportional counters or other alternative detectors based on $^{10}$B or $^6$Li.

FIG. 3 is a chart showing a plurality of parameters 300 associated with some embodiments of the present specification. In a first embodiment, shown in row 301, the system uses, as the irradiation probe, x-rays for high resolution radiography and to induce fission events whose signatures can be detected, including prompt neutrons and delayed-gamma rays using the fluorocarbon detector and delayed neutrons using a thermalized neutron detector.

In a second embodiment, shown in row 302, monoenergetic high-energy gamma rays are employed as the probing radiation to stimulate fissions and allow for the measurement of prompt neutrons, delayed neutrons and delayed-gamma rays.

In a third embodiment, shown in row 303, fast neutrons are generated from a charged-particle accelerator accelerating, for example deuterons impinging on deuterium target, generating high-energy neutrons to stimulate fission events. The fission events are detected via the resultant prompt neutrons from fast neutron fissions, thermal-neutron fissions, delayed-gamma rays and delayed neutrons also emitted as a result of the fission process.

In a fourth embodiment, shown in row 304, an x-ray source, such as a 9 MeV linac is employed to generate x-rays as well as neutrons via photoneutron conversion. Both radiation probes stimulate fission events in fissionable material, if present. The fission events are detected via the following signatures: prompt neutrons resulting from fast and thermal-neutron fissions, delayed-gamma rays and delayed neutrons. All emitted as a result of the fission process. The x-rays can serve also to provide high resolution x-ray radiography of the cargo.

In one embodiment, the system of the present specification is a two-tier inspection system wherein during a primary scan, a truck or cargo container (object) is completely scanned with a fan beam of single or multi-energy high-energy radiation, the transmitted radiation is measured with a detector array, and the resultant transmission information and optionally the fission signatures are analyzed to determine the presence of high-density, high-Z and fissionable materials. If an alarm is generated for one or more areas in the container, the suspect areas are subjected to a secondary scan.

In one embodiment, for the first scan process, a container is completely and rapidly inspected using two independent co-linear radiography arrays, a primary array and a Z-based transmission spectroscopy array. The primary array uses, in one embodiment, 544 cadmium tungstate ($CdWO_4$) detectors with conventional current mode readouts using photodiodes providing images with very high spatial resolution. The Z spectroscopy array uses detectors with energy sensitivity. These detectors may have a lower resolution and may cover approximately one-fourth the area that is covered by the conventional x-ray array and, in one embodiment, are comprised of fast plastic scintillators with spectroscopic readouts using fast photomultiplier tubes.

Each of the independent radiography arrays are used to locate high-Z objects in the image, such as lead, tungsten and uranium, which would be potential shielding materials as well as the nuclear material itself. The high-Z detection techniques cannot however, distinguish potential shielding materials such as lead or tungsten from nuclear material. Therefore, in one embodiment, the system and method of the present invention provides a second stage screening technique for discrimination of nuclear material from shielding materials. The second step of the inspection process is a more detailed inspection of the location identified by the first stage automated X-ray system as a possible alarm. This is achieved by a longer, stationary direct scan of that location, where areas of the container image that were identified as high-Z are re-inspected by repositioning the container to the location of the high-Z object and irradiating the area with the X-ray beam while the container remains stationary.

The system comprises an array of detectors to measure the transmitted radiation and an array of detectors to detect the fission signatures. The detectors to measure the transmitted radiation comprise at least one radiographic detector array, or one spectroscopic detector array. Methods to analyze the transmitted information include those techniques disclosed in U.S. Pat. No. 8,633,823, entitled "Systems and Methods for Automated, Rapid Detection of High Atomic Number Materials" and U.S. patent application Ser. No. 13/033,590, entitled "A High Energy X-Ray Spectroscopy-Based Inspection System and Methods to Determine the Atomic Number of Materials", both by the Applicant of the present specification and both of which are herein incorporated by reference in their entirety.

In one embodiment, the detectors used to measure the fission signatures comprise at least one gamma-ray detector (e.g. plastic and liquid scintillators), a threshold activation detector (TAD), or a neutron detector (e.g. 3He or 3He replacement). The gamma-ray and TAD detectors measure delayed gamma rays, the TAD measures prompt-neutron delayed activation and the neutron detectors measure delayed neutrons.

Since the X-ray beam has a continuous spectrum of X-rays with an endpoint having an energy of approximately 9 MeV, some of the X-rays are above the energy required to cause photo-fission (approximately 6 MeV). SNM threats, as well as all fissionable materials will undergo fission and produce fissions while interacting with the X-ray beam. The system looks for one or more types of fission signatures to identify whether fission is taking place. These may be prompt neutrons from the direct fission process and delayed-gamma rays from the decay of the fission products, as described in detail above. In one embodiment, the system of the present specification uses two types of detectors in the array: plastic scintillators (such as those fabricated from polyvinyl toluene) and fluorocarbon-based threshold-activation detectors in the form of liquid scintillators. The plastic scintillators can detect delayed-gamma rays only. The fluorocarbon detectors can detect both delayed-gamma rays and prompt neutrons via the reaction $^{19}F(n,\alpha)^{16}N$, which has an effective threshold of 3 MeV, and is therefore insensitive to most source photoneutrons. Exceptions are beryllium and deuterium which can produce higher than 3 MeV neutrons. Beryllium is a rare cargo threat material that will cause neutron alarms but will have no accompanying delayed-gamma ray signature. The background from deuterium in normal hydrogenous materials is small.

As described above, the isotope $^{16}N$ beta decays with a 7.1 second half-life. There are two major beta decay modes: 10.4 MeV endpoint (26%) and 4.3 MeV (68%). The detection of the prompt fission neutrons by the fluorocarbon detector is achieved by the close to 100% efficiency of the high-energy beta decay rather than the alpha particle in the (n, $\alpha$) reaction which occurs during the X-ray pulse. The major advantage of detecting delayed-gamma rays and prompt neutrons using the fluorocarbon detector is that signals are delayed, relative to the fission event and the X-ray pulse. The X-ray pulse temporarily blinds the detectors; however the detectors recover between the pulses.

In one embodiment, the tasks of performing primary and secondary inspections are integrated into a single system. In one embodiment, the integrated primary and SNM alarm resolution system may be implemented in a portal or gantry configuration. The gantry may be movable, such that if a complete truck or cargo vehicle is to be inspected, the vehicle remains stationary and the gantry can be moved to scan the complete vehicle. On the other hand, if only the container is to be inspected, the gantry may be operated as a portal (stationary gantry) and the container may be passed through for inspection, with the source radiation turned on to scan the container only.

Figure 4:
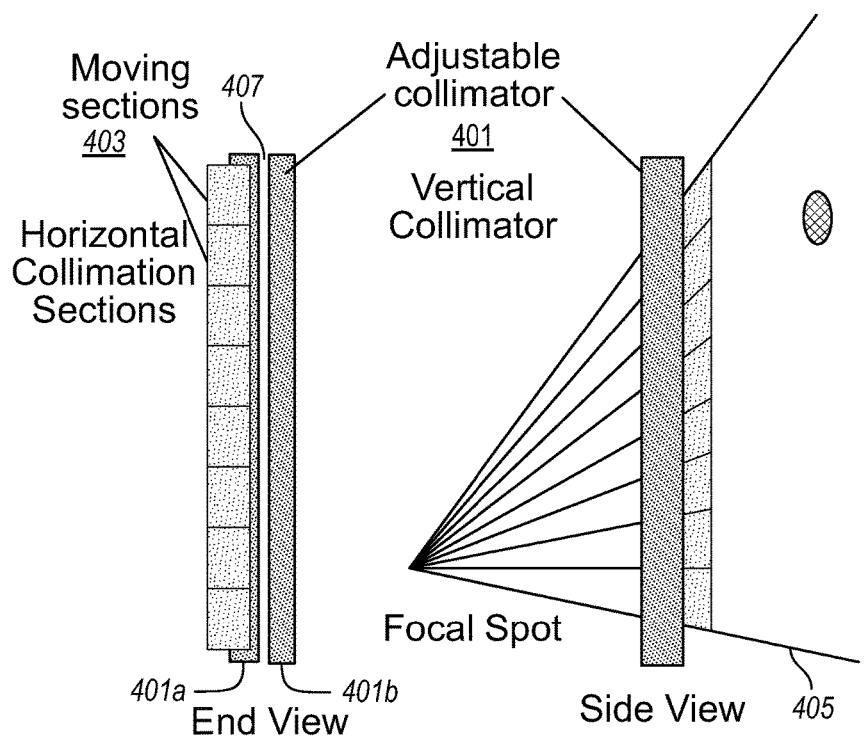
FIG. 4 illustrates exemplary collimators for a primary scan.

FIG. 4 illustrates an arrangement of horizontal and vertical collimators for collimating the scanning radiation beam during the primary scan. In this case, the objective is to produce a high resolution transmission radiographic image. The image however, is not specific to individual areas of the scanned object (container). Therefore, the adjustable collimator 401 is positioned such that the generated fan beam 405 covers the entire slice of the moving cargo. The collimator 401 comprises horizontally movable sections 403, which can be adjusted to change the beam width by covering portions of a vertical opening 407 formed from two sections 401a and 401b of adjustable collimator 401. The two sections 401a and 401b are vertically elongated structures which define a vertical opening or slit 407 of sufficient height to permit the creation of a fan beam from a radiation source that is capable of encompassing an entire slice of the target object. As shown in FIG. 4, the horizontally movable sections 403 are offset from vertical collimator opening 407, in one embodiment, so that the fan beam 405 that is generated is of a maximum height and may cover the entire slice of moving cargo.

Figure 5:
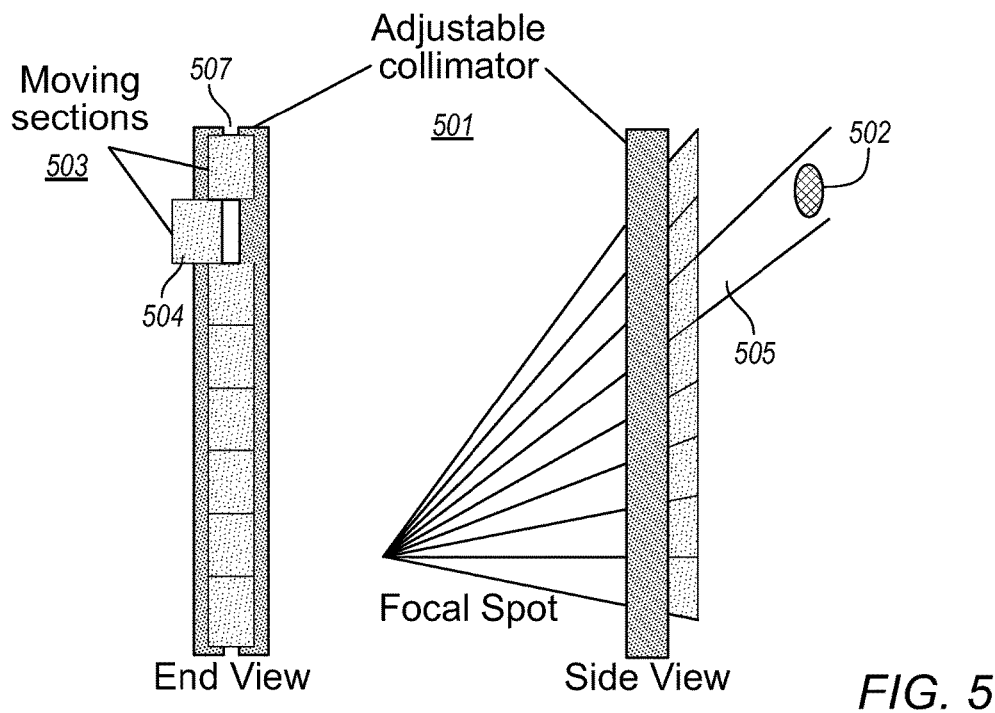
FIG. 5 illustrates exemplary collimators for a secondary scan.

FIG. 5 illustrates the arrangement of the collimators for collimating the scanning radiation beam during the secondary scan. Here, the objectives are to inspect most of the extent of the object without irradiating neighboring areas, as shown by the circle 502. Therefore, vertical collimator section 501 allows for an opening 507 that covers all/most of the area of interest. The appropriate horizontally movable sections 504 of the vertical collimator 503 are positioned in such a manner, that the radiation beam 505 is highly attenuated by the moving sections to block the beam except for the section that allows the beam to irradiate the area of interest. This restriction of the collimator opening not only helps to scan primarily the suspect area, but also helps to reduce background and dose to the cargo and environment.

In one embodiment, the intensity of the radiation may optionally be modulated during the primary scan to reduce the dose to the environment and cargo.

Figure 6:
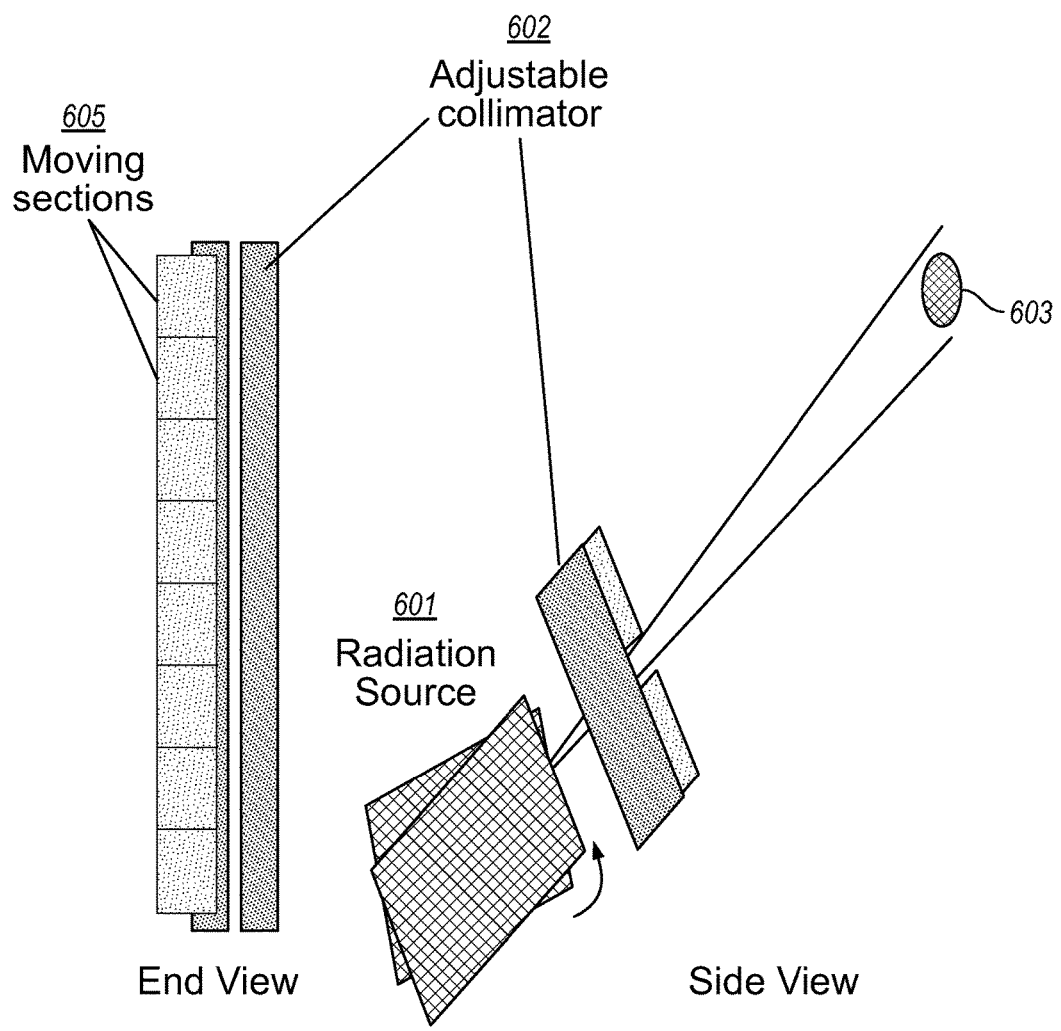
FIG. 6 illustrates an exemplary configuration for a secondary scan with a tilted source.

During secondary scan, the objective is to scan the suspected area in greater detail. Therefore, the scanning beam is focused on the target area only. In one embodiment, as shown in FIG. 6, this is achieved by tilting the radiation source 601 such that its center axis aligns with center of the suspect area, which is represented by the circle 603. Further, the adjustable collimator 602, with horizontally movable sections 605, is opened such that the produced fan beam is focused only at the area of interest. Bremsstrahlung radiation is forward peaked so the highest intensity part of the beam is the one produced in the same direction of the electron beam that produces the x-rays. Therefore, aligning the axis of the radiation source with the center of the object ensures that the maximum amount of radiation is used to scan the target object.

Figure 7A:
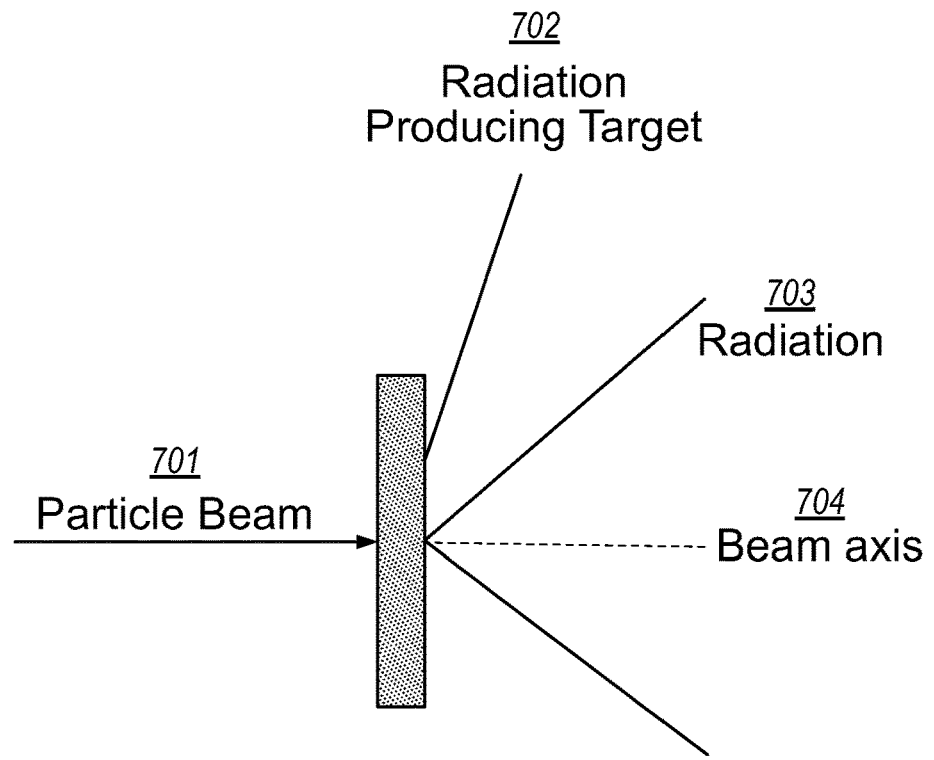
FIG. 7A illustrates an exemplary radiation beam configuration for a primary scan, with a steered particle beam.
Figure 7B:
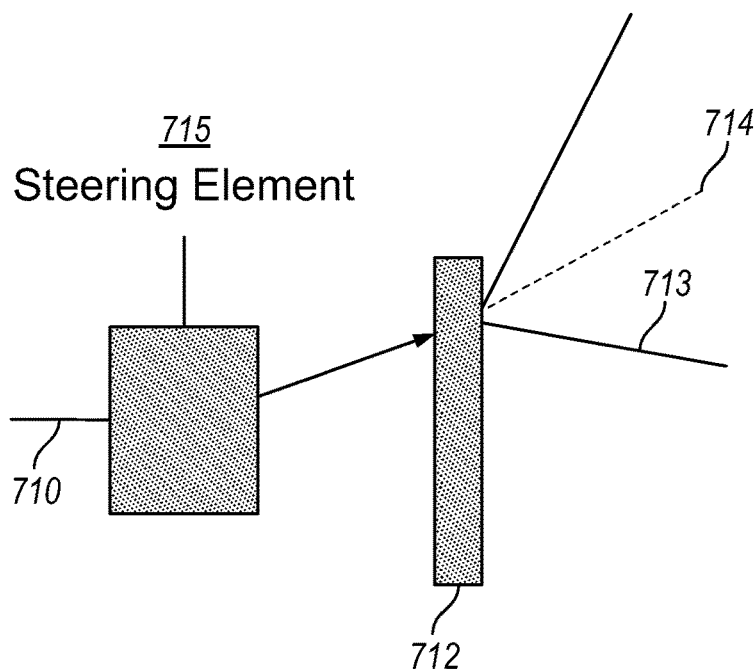
FIG. 7B illustrates an exemplary radiation beam configuration for a secondary scan, with a steered particle beam.

In a further embodiment, the X-ray source is maintained fixed and the electron beam is steered in such a way that the axis of the electron beam used to generate the X-rays intersects the center of the alarming region, as shown in FIGS. 7A and 7B. Referring to FIG. 7A, during the primary scan, particle beam 701 hits a radiation producing target 702. It may be noted that the particle beam may comprise electrons, neutrons, deuterons or any other suitable particle. The radiation producing target converts from one type of radiation to the type that is desired (in this case, X-rays), resulting in a beam of radiation 703, which is fan-shaped relative to the beam axis 704.

Referring to FIG. 7B, during the secondary scan, a steering element 715 is placed in the path of particle beam 710 before it hits the radiation producing target 712. The beam axis 714 of the resultant fan beam 713 is tilted or aligned in the direction of the target area of interest, as desired. When their axes are aligned, the highest intensity of the beam axis is in the direction of the object. In other words, this allows for the highest radiation flux to be directed towards the suspect object.

In a preferred embodiment, a high-output approximately 9 MV X-ray source is used to perform the transmission measurements and to induce the fission with a primary micro-pulsing mode and secondary macro-pulsing mode, with source aimed at the suspect object with adjusted collimators.

One of ordinary skill in the art would appreciate that during secondary inspection, the active background needs to be subtracted from the signal obtained when interrogating the suspect object, but the background changes with cargo position. Therefore, in one embodiment, the secondary scan is performed in two steps. In the first step, a background scan of the region around the area of interest is obtained. In the next step, the exact location of the area of interest is scanned, and the background from the previous scan is subtracted.

Figure 8A:
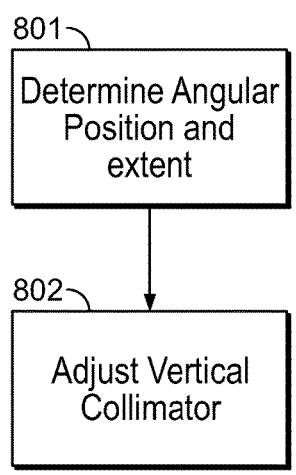
FIG. 8A is a flowchart describing one embodiment for adjusting the beam so that it is directed toward alarming objects.
Figure 8B:
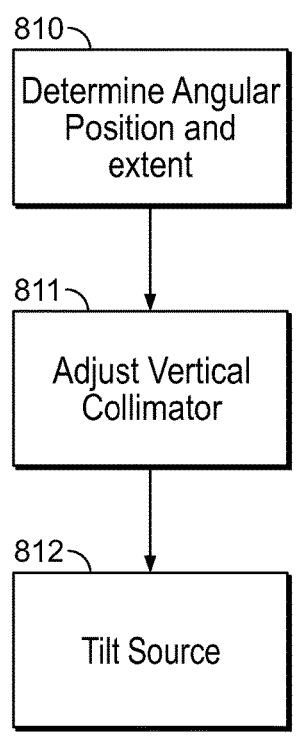
FIG. 8B is a flowchart describing one embodiment for adjusting the beam so that it is directed toward alarming objects.
Figure 8C:
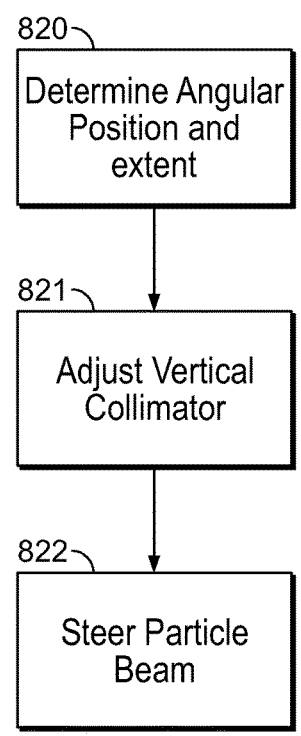
FIG. 8C is a flowchart describing one embodiment for adjusting the beam so that it is directed toward alarming objects.

FIGS. 8A, 8B and 8C illustrate three methods for adjusting the beam directed to the alarming objects. Referring to FIG. 8A, first the angular position and the extent or footprint of the suspect area are determined, as shown in step 801. Then, the vertical collimator opening is adjusted in 802 to direct the beam at the suspect area.

In another embodiment, shown in FIG. 8B, first the angular position and the extent or footprint of the suspect area are determined in step 810, followed by adjusting the position of the vertical collimator opening in 811. Thereafter, the source may be tilted, as shown in step 812, to direct the highest intensity part of the Bremsstrahlung x-ray beam at the suspected area.

In yet another embodiment, shown in FIG. 8C, the angular position and the extent or footprint of the suspect area are determined in step 820, followed by adjusting the position of the vertical collimator opening in step 821. Thereafter, the particle beam may be steered using an appropriate mechanism, as shown in step 822, to direct the highest intensity part of the Bremsstrahlung x-ray beam at the suspected spot.

Figure 9A:
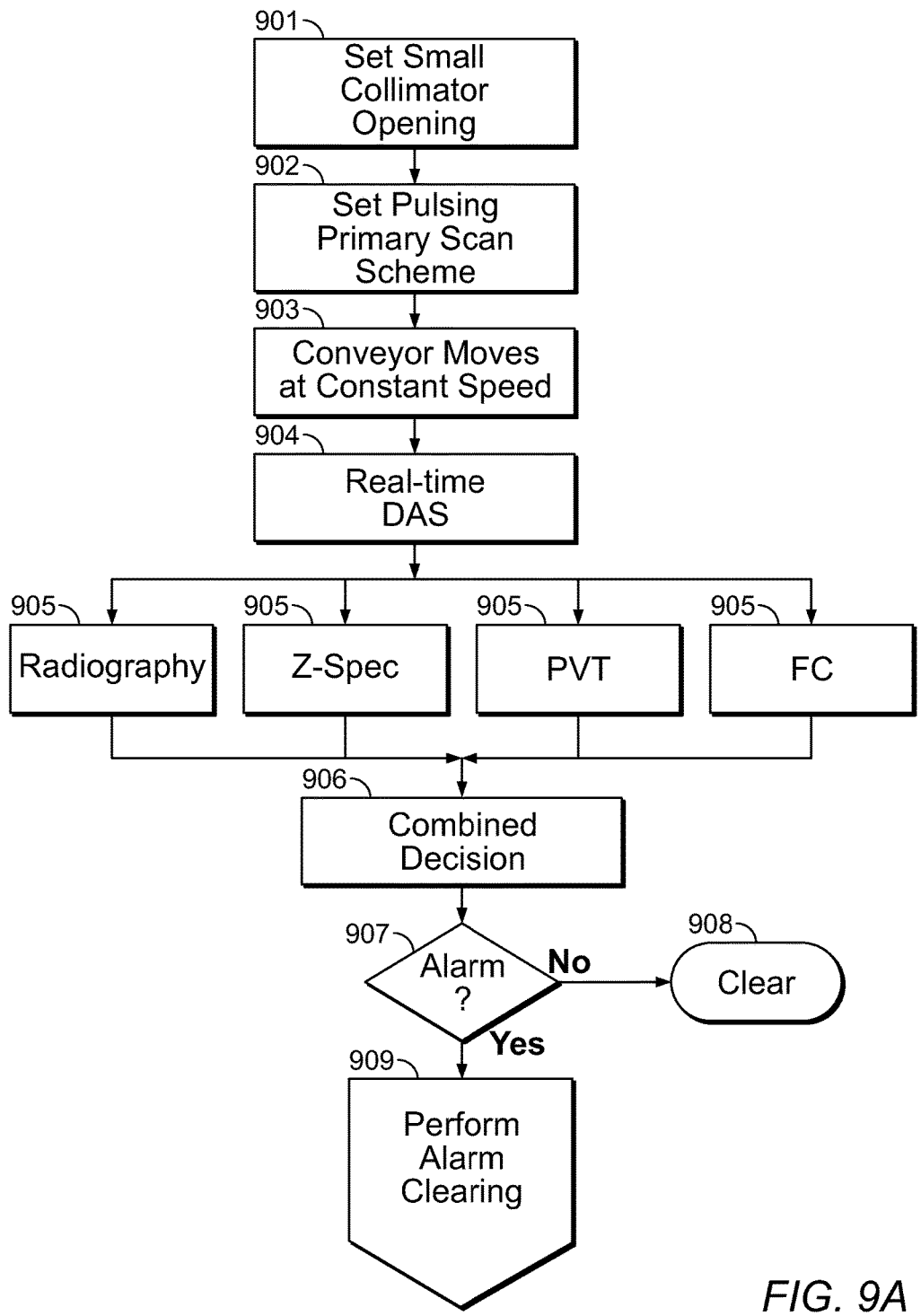
FIG. 9A is an exemplary flowchart of a primary scan process.

FIG. 9A is a flow chart describing the operation of the system during a primary scan. Referring to FIG. 9A, in the first step 901, the collimator opening for adjusting the fan beam of scanning radiation is set to "small", so as to produce a narrow fan beam that will serve to reduce scatter which tends to deteriorate the image quality of the transmission information. In addition a narrow fan beam that reduces scatter will also reduce the dose to the environment. One of ordinary skill in the art would appreciate that the width of the fan beam is enough to cover the X-ray detectors and capture a slice of cargo as it moves. Next, in step 902, a suitable pulsing scheme for the X-ray source is set. It would be appreciated that the pulsing mode for the primary scan and secondary scans may be different. In the primary scan, the source is pulsed in a continuous mode to provide a good sampling. A higher pulsing rate is preferred to improve the signal-to-noise ratio.

The conveyer moves the container under inspection at a constant speed, as shown in step 903. X-ray transmission and fission signals (if any) produced by the object are simultaneously acquired in real-time by the Data Acquisition System (DAS), as shown in step 904. The DAS acquires radiographic, Z-Spectroscopy, plastic scintillator, and/or fluorocarbon (FC) data from the respective detectors, as shown in step 905. In step 906, the data is combined and using the combined data, as shown in step 907, the system determines whether to issue an alarm. If the presence of nuclear materials is not suspected, no alarm is issued and the object is cleared, as shown in 908. Otherwise, a secondary scan is performed to clear the alarm or take further action, as shown in 909.

Figure 9B:
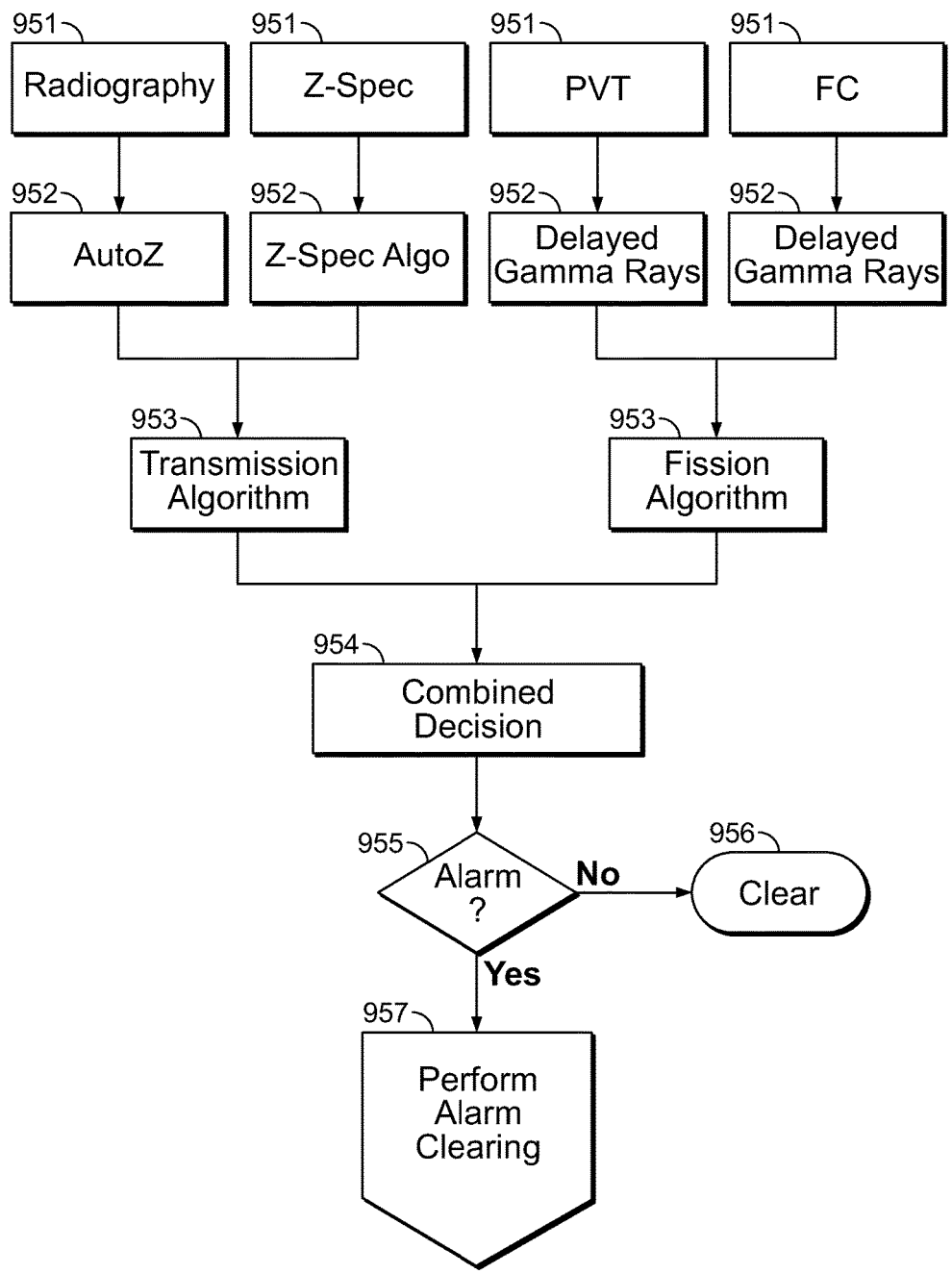
FIG. 9B is an exemplary flowchart of a primary scan decision process.

FIG. 9B illustrates the decision making process that is employed during the primary scan. Referring to FIG. 9B, data is obtained from radiography, Z spectroscopy, plastic scintillator and fluorocarbon detector signals, as shown in step 951. This data is analyzed, in step 952, to obtain atomic number (Z) information from radiographic and Z spectroscopy, and delayed gamma ray information from the plastic scintillator and fluorocarbon detectors. In the next step 953, a transmission analytical process is applied to the atomic number information and a fission analytical process is applied to the delayed gamma ray data to identify any suspect area or material in the object under inspection. Thereafter, a decision may be based on the combined results from the two analytical processes to issue an alarm, as shown in steps 954 and 955. If no suspect area or material is identified, no alarm is issued and the object is cleared, as shown in 956. If the presence of contraband or nuclear material is suspected, an alarm is issued and alarm clearing is performed using a second scan, as shown in step 957.

The active interrogation induces active background that is cargo and position dependent. Also, there is a natural background that changes based on the cargo. Therefore, it is necessary to measure the background in the areas neighboring the alarm.

Figure 10A:
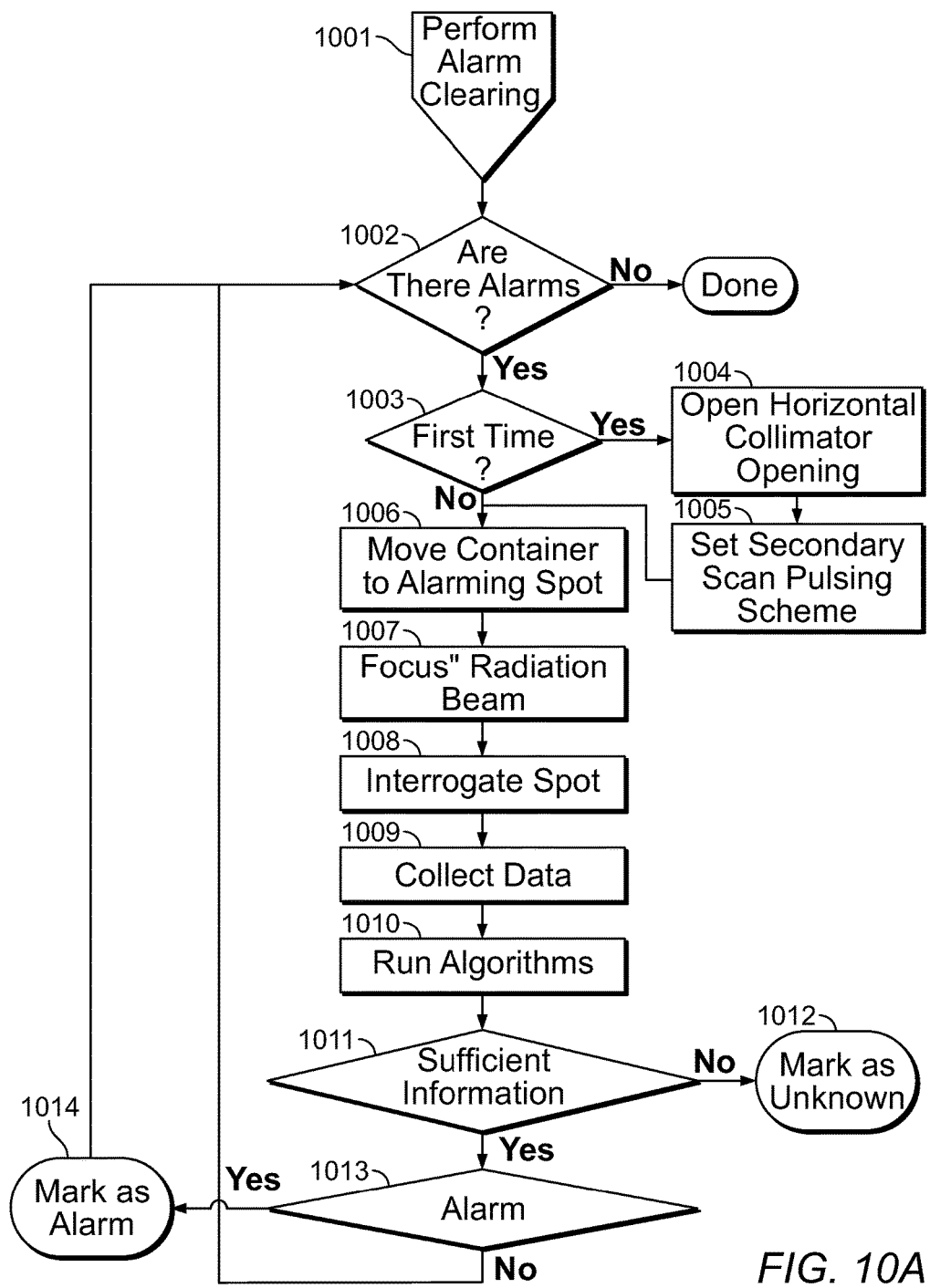
FIG. 10A is an exemplary flowchart of a secondary scan process.

FIG. 10A describes the operation of the system during a secondary scan 1001 for performing alarm clearance. Referring to FIG. 10A, the system first determines, in step 1002, if there are any alarms resulting from the first scanning process. It also checks in 1003, if the alarm has been issued for the first time. In the case of a first time alarm, a horizontal collimator is opened as shown in step 1004. During the secondary scan process, the horizontal beam opening is increased to increase the exposure to the sample and therefore, to induce higher fission signals. Thereafter, a suitable pulsing scheme is set, as shown in step 1005. It should be noted that during the secondary scan, a continuous pulsing mode could be used, but it preferred to have a lower pulsing frequency to allow for a wider measuring window during the pulses. A macro-pulsing mode is also possible during the secondary scanning process, wherein the radiation is pulsed at a high frequency for a first time period (e.g. a few seconds) and the measurement takes place for a second time period of time while the beam is turned off. In some embodiments, the measurement time is in the same range of time as the pulsing time, while in other embodiments, the first and second time periods are equal.

In step 1006, the container is moved such that only the suspect area which is causing an alarm is interrogated. After moving the container to the correct position, the radiation beam is focused towards the suspect area, in step 1007. Next, the suspect area is interrogated in step 1008 and scan data is collected in step 1009. The system then runs appropriate analytical processes with scan data, as shown in step 1010, to determine, in step 1011, if sufficient information is present to confirm the presence of contraband. If there is not sufficient information to identify the alarming material or object, the suspected area is marked as "unknown", as shown in step 1012. If there is sufficient information, the system decides whether to issue an alarm, in step 1013. If the alarming material or object is still not identified, an appropriate alarm may be issued, as shown in step 1014. The system continues to perform scans on portions of the object, until all alarms are cleared.

Figure 10B:
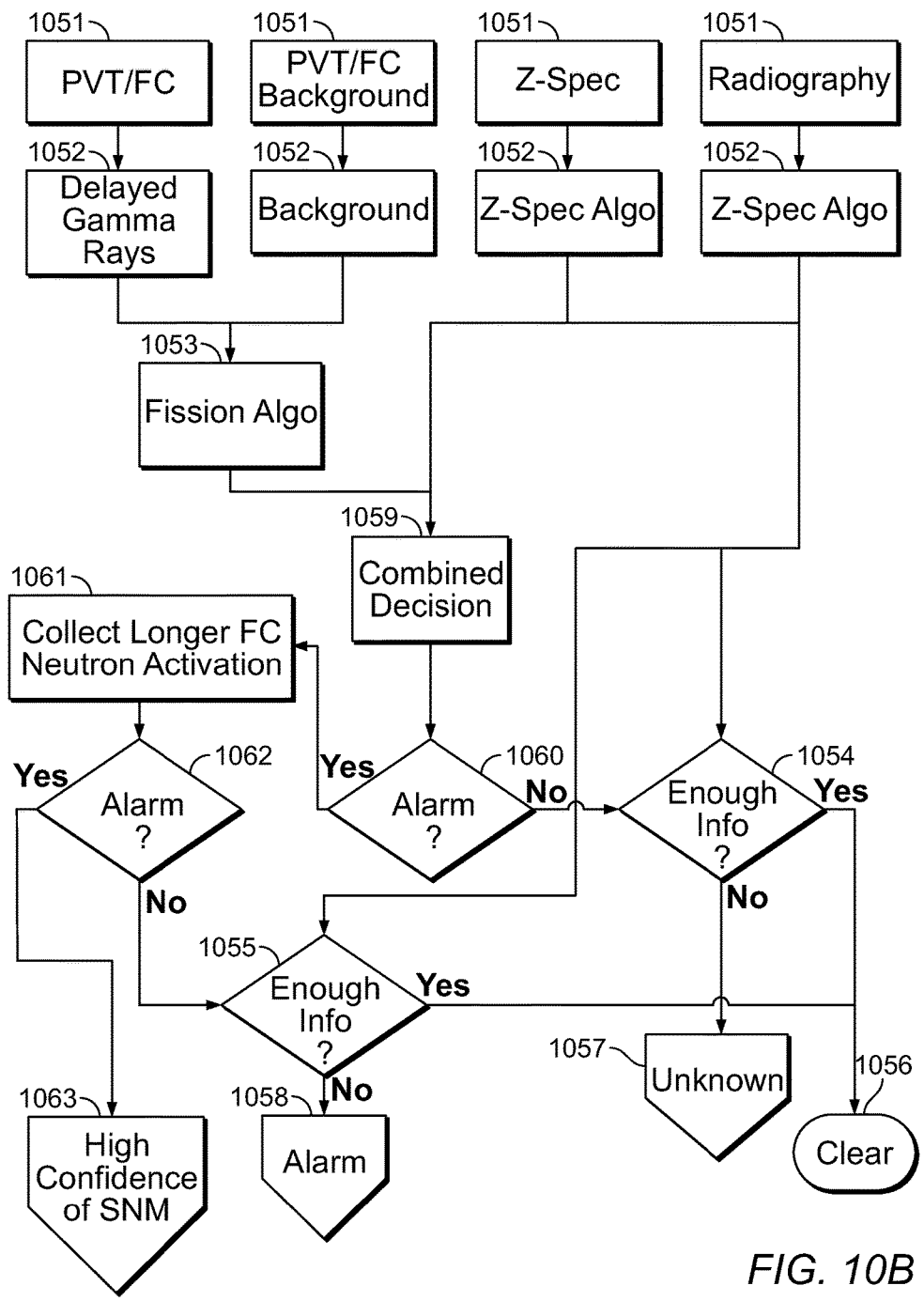
FIG. 10B is an exemplary flowchart of a secondary scan decision process.

FIG. 10B illustrates a decision-making process involved with the secondary scan. Referring to FIG. 10B, when the object is scanned a second time, the data obtained comprises plastic scintillator/fluorocarbon detector background, Z spectroscopy, and radiography signals, as shown in step 1051. From PVT/FC and PVT/FC background, delayed gamma ray and background information is obtained in step 1052. Also in step 1052, radiographic and Z-SPEC data is analyzed using Z-SPEC algorithm to obtain atomic number (Z) information.

Delayed gamma ray and background information obtained in step 1052 is analyzed by a fission algorithm in step 1053. Based on the atomic number and fission information, the system takes a combined decision on whether to issue in alarm, in steps 1059 and 1060. In case of an alarm, data for longer time may be collected to determine whether the weaker but more fission-specific signature of prompt neutrons is present, in step 1061. If this data still yields an alarm, the system pronounces a high confidence presence of SNM, as shown in steps 1062 and 1063. If there is no alarm, information is input in step 1054 and in step 1055, the system then determines if the cargo materials could attenuate the signals and mask the signatures to clear the suspect area, in step 1056, mark it as unknown in step 1057 or issue an alarm in step 1058.

The above examples are merely illustrative of the many applications of the system of present invention. Although only a few embodiments of the present invention have been described herein, it should be understood that the present invention might be embodied in many other specific forms without departing from the spirit or scope of the invention. Therefore, the present examples and embodiments are to be considered as illustrative and not restrictive, and the invention may be modified 22 within the scope of the appended claims.

We claim:

1. An inspection system for inspecting an object using radiation comprising:
   a movable radiation source for generating and transmitting radiation;
   a collimator positioned in front of said radiation source wherein said collimator comprises two vertical structures defining a vertical slit through which said transmitted radiation is directed and a plurality of horizontally movable members positioned in front of said vertical slit, wherein said plurality of horizontally movable members each have a first configuration where they block more of the transmitted radiation from passing through the vertical slit and a second configuration where they block less of the transmitted radiation from passing through the vertical slit;
   a detector array for detecting a portion of transmitted radiation passing through said object; and
   a controller, wherein said controller is configured to subject the object to a first scan and a second scan, is configured to reposition the plurality of horizontally movable members between the first configuration and the second configuration based on whether the first scan or second scan is being implemented, and is configured to reposition the movable radiation source to align a center axis of the radiation source with a suspect area identified in the first scan before implementing the second scan.

2. The inspection system of claim 1 wherein during the first scan, the controller is configured to cause each of said plurality of horizontal members to be positioned to block an equivalent portion of said vertical slit.

3. The inspection system of claim 2 wherein said equivalent portion of said vertical slit is no portion of said vertical slit, thereby enabling a maximum width fan beam to be generated.

4. The inspection system of claim 1 further comprising a processor, wherein said processor is adapted to analyze said detected portion of transmitted radiation to determine a presence of high-density and high atomic number materials.

5. The inspection system of claim 4, wherein said processor is adapted to cause the inspection system to conduct the second scan based upon said determination of a presence of high-density and high atomic number materials.

6. The inspection system of claim 5, wherein said repositioning of said radiation source and the at least a portion of said plurality of horizontal members occurs after the first scan and wherein said repositioning enables a generation of a fan beam focused on a suspect area in the second scan that is smaller than an area scanned in said first scan.

7. The inspection system of claim 6, wherein upon repositioning the at least a portion of said plurality of horizontal members, each of said plurality of horizontal members do not block an equivalent portion of said vertical slit.

8. The inspection system of claim 6 wherein said processor is adapted to analyze radiation detected in said second scan to measure radiation signatures and analyze the measured radiation signatures to clear or confirm a presence of high-density or high atomic number materials in the suspect area.

9. The inspection system of claim 5, wherein the detector array is configured to apply a spectral analysis to perform said determination of high atomic number material.

10. The inspection system of claim 1 wherein, in the first configuration, the plurality of horizontal members is positioned to block all of the transmitted radiation from passing through the vertical slit.

11. The inspection system of claim 1 wherein, in the second configuration, the plurality of horizontal members is positioned to block none of the transmitted radiation from passing through the vertical slit.

12. The inspection system of claim 1 wherein, in the first or second configuration, the plurality of horizontal members is positioned to block some of the transmitted radiation from passing through the vertical slit.

13. The inspection system of claim 1 wherein the radiation source comprises a single energy or multi-energy X-ray source having an energy of approximately 9 MV.

14. The inspection system of claim 13, wherein the X-ray source is coupled with a neutron production target to produce a mixed x-ray and neutron beam.

15. The inspection system of claim 14 wherein the neutron production target is deuterium or beryllium.

16. The inspection system of claim 13 further comprising a processor adapted to analyze fission signatures to determine a presence of fissionable materials, wherein the controller is configured to cause an area external to, but proximate to, the suspect area to be scanned to generate a background signal and wherein the processor is configured to subtract the background signal from a signal generated by scanning the suspect area.

17. The inspection system of claim 1, wherein the radiation source is a neutron source.

18. The inspection system of claim 1 further comprising at least one of a plastic or a liquid scintillator wherein said at least one of a plastic or a liquid scintillator is configured to measure delayed gamma rays.

19. The inspection system of claim 1 further comprising a threshold-activation detector, wherein said threshold-activation detector is configured to measure prompt neutrons.

20. The inspection system of claim 19 wherein the threshold-activation detector is a fluorocarbon-based detector.

21. The inspection system of claim 1 wherein the detector array further comprises at least one detector configured to measure delayed gamma rays.

* * * * *